(12) United States Patent
Hao et al.

(10) Patent No.: US 12,163,005 B2
(45) Date of Patent: Dec. 10, 2024

(54) MULTILAYER AND FLEXIBLE CAPACITORS WITH METAL-ION DOPED $TIO_2$ COLOSSAL PERMITTIVITY MATERIAL/POLYMER COMPOSITES

(71) Applicant: THE HONG KONG POLYTECHNIC UNIVERSITY, Hong Kong (CN)

(72) Inventors: Jianhua Hao, Hong Kong (CN); Mei-Yan Tse, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 1019 days.

(21) Appl. No.: 17/042,953

(22) PCT Filed: Apr. 28, 2019

(86) PCT No.: PCT/CN2019/084740
§ 371 (c)(1),
(2) Date: Sep. 29, 2020

(87) PCT Pub. No.: WO2019/206321
PCT Pub. Date: Oct. 31, 2019

(65) Prior Publication Data
US 2021/0054168 A1    Feb. 25, 2021

Related U.S. Application Data

(60) Provisional application No. 62/663,340, filed on Apr. 27, 2018.

(51) Int. Cl.
*C08K 3/22*    (2006.01)
*B29C 39/14*    (2006.01)
(Continued)

(52) U.S. Cl.
CPC .............. *C08K 3/22* (2013.01); *C08J 3/212* (2013.01); *C08J 5/18* (2013.01); *C08K 9/02* (2013.01);
(Continued)

(58) Field of Classification Search
CPC .......... C08L 27/16; C08L 27/18; H01G 4/12; H01G 4/18; C08K 2003/2237
See application file for complete search history.

(56) References Cited

U.S. PATENT DOCUMENTS

2012/0245016 A1* 9/2012 Curry .................. C08K 3/30
977/773
2016/0005552 A1* 1/2016 Blum .................. H01G 11/56
429/7
2016/0013547 A1* 1/2016 Tishin .................. H01Q 1/40
343/873

FOREIGN PATENT DOCUMENTS

CN    102070854 A    5/2011
CN    105086359 A    11/2015
CN    107640970 A    1/2018

OTHER PUBLICATIONS

Peng (Preparation and properties of the copper calcium titanate-modified poly(vinylidene fluoride). Journal of Elastomers & Plastics, 47(5), 2015, pp. 463-476).*

(Continued)

*Primary Examiner* — Brieann R Johnston
(74) *Attorney, Agent, or Firm* — Yue (Robert) Xu; Apex Attorneys at Law, LLP

(57) ABSTRACT

Disclosed is polymer-ceramic composite material with colossal permittivity, comprising polymer matrix and ceramic powders embedded in the polymer matrix, wherein a part of the polymer matrix is exposed and adsorbed to the surface of the ceramic powders, and the polymer is electrically insulating. This invention simultaneously achieves (Continued)

large dielectric constant, negligible dielectric loss and high energy density in flexible composite capacitors based on metal-ion co-doped colossal permittivity materials. The host oxides used in this CP system is friendly to the environment, non-toxic and abundant. Additionally, the process developed is relatively simple, low cost and suitable for mass production-scale. Therefore, these composite capacitors have great technological potential for many applications. Compared to the conventional ceramic materials, composites of this invention are lightweight, scalable and easily fabricated into complex shapes towards miniaturization of the compact systems. The additional flexibility feature also possesses broad application prospects in modern electronic and energy storage devices.

21 Claims, 18 Drawing Sheets

(51) Int. Cl.
| | |
|---|---|
| *B29C 71/02* | (2006.01) |
| *B29K 27/12* | (2006.01) |
| *B29K 105/00* | (2006.01) |
| *B29K 509/02* | (2006.01) |
| *C08J 3/21* | (2006.01) |
| *C08J 5/18* | (2006.01) |
| *C08K 9/02* | (2006.01) |
| *C09C 1/36* | (2006.01) |
| *H01G 4/12* | (2006.01) |
| *H01G 4/20* | (2006.01) |
| *H01G 4/33* | (2006.01) |

(52) U.S. Cl.
CPC ......... *C09C 1/3653* (2013.01); *H01G 4/1218* (2013.01); *H01G 4/206* (2013.01); *B29C 39/14* (2013.01); *B29C 71/02* (2013.01); *B29C 2071/022* (2013.01); *B29K 2027/12* (2013.01); *B29K 2105/0073* (2013.01); *B29K 2509/02* (2013.01); *C01P 2002/52* (2013.01); *C01P 2002/72* (2013.01); *C01P 2002/82* (2013.01); *C01P 2002/88* (2013.01); *C01P 2004/03* (2013.01); *C01P 2006/40* (2013.01); *C08J 2327/16* (2013.01); *C08K 2003/2241* (2013.01); *H01G 4/33* (2013.01)

(56) References Cited

OTHER PUBLICATIONS

Zhang (Superior Energy Storage Performances of Polymer Nanocomposites via Modification of Filler/Polymer, Adv. Mater. Interfaces, Apr. 26, 2018, 5, 28 pages).*

Liu (Significantly enhanced dielectric property in PVDF nanocomposites flexible films through a small loading of surface-hydroxylated $Ba_{0.6}Sr_{0.4}TiO_3$ nanotubes, J. Mater. Chem. A, 2014, 2, 18040-18046).*

Almadhoun (Nanocomposites of ferroelectric polymers with surface-hydroxylated $BaTiO_3$ nanoparticles for energy storage applications, J. Mater. Chem., 2012, 22, pp. 11196-11200).*

International Search Report for PCT/CN2019/084740 mailed Jul. 30, 2019, ISA/CN.

\* cited by examiner

MULTILAYER AND FLEXIBLE CAPACITORS WITH METAL-ION DOPED $TiO_2$ COLOSSAL PERMITTIVITY MATERIAL/POLYMER COMPOSITES

CROSS REFERENCE TO RELATED APPLICATIONS

This application is a US National Phase application based upon PCT Application No PCT/CN2019/04740, fled Apr. 28, 2019, which claims the priority of U.S. provisional patent application No. 62/663,340, filed on Apr. 27, 2018, and the disclosures of which are hereby incorporated by reference.

FIELD

The present disclosure relates to electronic technology field, especially to a multilayer and flexible capacitor composed of metal-ion doped $TiO_2$ colossal permittivity material/polymer composites by simple techniques, demonstrating simultaneously large dielectric constant, negligible dielectric loss and relatively high energy density.

BACKGROUND

Colossal permittivity (CP) materials are imperative because of their potential for promising applications in the areas of device miniaturization and energy storage. High-performance CP materials require high dielectric permittivity, low dielectric loss and relatively weak dependence of frequency- and temperature. Dielectric capacitors exhibit advantages, including solid-state construction, high operating voltage and long cycling lifetime compared to other energy storage devices. However, low energy density and large dissipation are the two major problems to hinder their practical applications. It is known that conventional dielectric capacitors usually have an energy density less than 2 $J/cm^3$, which is mainly restricted by the low dielectric constants of polymers or low breakdown field of ceramics. A wide range of solid-state capacitors with CP have been studied. Still, it is challengeable to maximize their performance as they show drawbacks in two aspects: temperature/frequency dependent properties and high dielectric loss. On one hand, the typical ferroelectric materials, barium titanate ($BaTiO_3$)-based perovskites, can only attain CP at the tetragonal-cubic phase transition temperature ($T_c$~120° C.). This may limit their applications to the devices working in a wide temperature range. On the other hand, the non-ferroelectric material $CaCu_3Ti_4O_{12}$ (CCTO) accomplishes giant dielectric constant but with high dielectric loss (>10⁻¹).

Although a great deal of effort has been put to explore on making ceramic/polymer composites, there is still a need in the art for a simple technique of making such a composite that possesses a large dielectric constant, a negligible dielectric loss and a relatively high energy density.

SUMMARY

Materials with colossal permittivity (CP) have shown great technological potential for advanced microelectronics and high-energy-density storage applications. Several types of CP materials have been studied. Still, it is challengeable to maximize their performance as they show drawbacks in two aspects: temperature/frequency dependent properties and high dielectric loss. In our work, original CP ceramic capacitors exhibited high-performance dielectric behaviors, including temperature and frequency stable CP value ($10^4$-$10^5$) and sufficiently low dielectric loss (0.03). These results indicate a high reliability of the capacitors. In addition, technologies on ceramics were extended to multi-layer-structured ceramic/polymer composite films. Surface hydroxylated ceramic fillers, embedded in copolymer matrix achieved high dielectric constant up to 300 and exceptional low dielectric loss down to 0.04 over a broad frequency range, as well as a high energy density of 8.9 $J/cm^3$ at breakdown field of 82 MV/m. Therefore, this composite film capacitors have great technological potential for many applications. In microelectronic systems, thin-film dielectric with high capacitance due to its minimal thickness and being located close to the microprocessor can reduce inductance. Thin-film capacitors can increase the capacitive density and drastically reduce the capacitor area, offering performance, volume, and cost advantages over discrete ceramic capacitors.

One object of the present disclosure is to provide a polymer-ceramic composite material with colossal permittivity, comprising polymer matrix and ceramic powders embedded in the polymer matrix, wherein a part of the polymer matrix is exposed and adsorbed to the surface of the ceramic powders, and the polymer is electrically insulating.

In some embodiments of the present disclosure, the ceramic powders comprise or essentially consisting of metal-ion doped $TiO_2$ ceramic powders, preferably the doping metal is one or both selected from Er and Nb, and for example, the metal-ion doped $TiO_2$ ceramic is represented by a formula of $(Er_mNb_n)_xTi_{1-x}O_2$, wherein m≥0, n≥0, m+n=1, 0≤x≤1, and e.g., x≤30%, 25%, 20%, 15%, 10%, 5%, 4%, 3%, 2%, 1%, 0.9%, 0.8%, 0.7%, 0.6%, 0.5%, 0.4%, 0.3%, 0.2%, 0.1%, and e.g., m=n.

In some embodiments of the present disclosure, the polymer is a fluoropolymer, and preferably selected from the group consisting of polytetrafluoroethylene (PTFE) and polyvinylidenefluoride (PVDF), e.g. polyvinylidenefluoride trifluoroethylene (PVDF-TrFE).

The polymer-ceramic composite material of the present disclosure is in the form of a flexible sheet with one or more layers, such as 1, 2, 3, 4, 5, 6, 7, 8, 9, 10 layers or more.

The polymer-ceramic composite material of the present disclosure, wherein a part of the polymer is adsorbed physically or chemically to the surface of the ceramic powders, e.g., hydrogen bond is formed between the ceramic powders and the polymer.

Another object of the present disclosure is to provide a method for fabricating the polymer-ceramic composite material, comprising:
  hydroxylating ceramic powders, e.g. with $H_2O_2$,
  mixing the ceramic powders with a polymer solution,
  subjecting the mixture to solution casting to obtain a film, and
  optionally hot pressing the casting film.

In some embodiments of the present disclosure, the hydroxylating step comprises treating the ceramic powders with a $H_2O_2$ solution under stirring and heating at 50-150° C. for 1-5 h; collecting the powders by centrifuge; washing the powders with water and then alcohol such as ethanol; and drying at 50-100° C.

In some embodiments of the present disclosure, the polymer solution is prepared by dissolving the polymer in an organic solvent such as dimethylformamide, and preferably, the polymer is polyvinylidenefluoride trifluoroethylene (PVDF-TrFE).

In some embodiments of the present disclosure, the method comprises the following steps:
- treating ceramic powders with a $H_2O_2$ solution under stirring and heating at 50-150° C. for 1-5 h,
- collecting the powders by centrifuge,
- washing the powders with water and ethanol,
- drying overnight at 50-100° C. to obtain ceramic powders with a modified surface,
- dissolving poly(vinylidene fluoride trifluoroethylene) powders in dimethylformamide to obtain a poly(vinylidene fluoride trifluoroethylene) solution,
- dispersing ultrasonically the obtained ceramic powders in dimethylformamide to obtain a ceramic powder solution,
- introducing the ceramic powder solution into the poly(vinylidene fluoride trifluoroethylene) solution with stirring for 4-12 h,
- sonicating the resulting mixture to form a stable suspension,
- depositing to form a composite film, and
- subjecting the film to hot pressing to obtain the polymer-ceramic composite.

Preferably, the poly(vinylidene fluoride trifluoroethylene) solution has a concentration of 10 wt %, the ceramic powder solution has a concentration of 2.5-7.5%, and the weight ration of the ceramic powder solution to the poly(vinylidene fluoride trifluoroethylene) solution in introducing is 30-50%.

Preferably, prior to hot pressing, comprising annealing the film at 100-150° C. for 8-12 h.

The method provided by the present disclosure, further comprises performing solution-casting for 2-6 times to obtain the polymer-ceramic composite with multiple layers.

The present disclosure also provides an electric capacitor comprising the polymer-ceramic composite material as dielectric layer.

The present disclosure also provides an energy storage device comprising the electric capacitor.

Furthermore, the present disclosure provides a microelectronic device comprising the electric capacitor.

DETAILED DESCRIPTION

Figure 1:
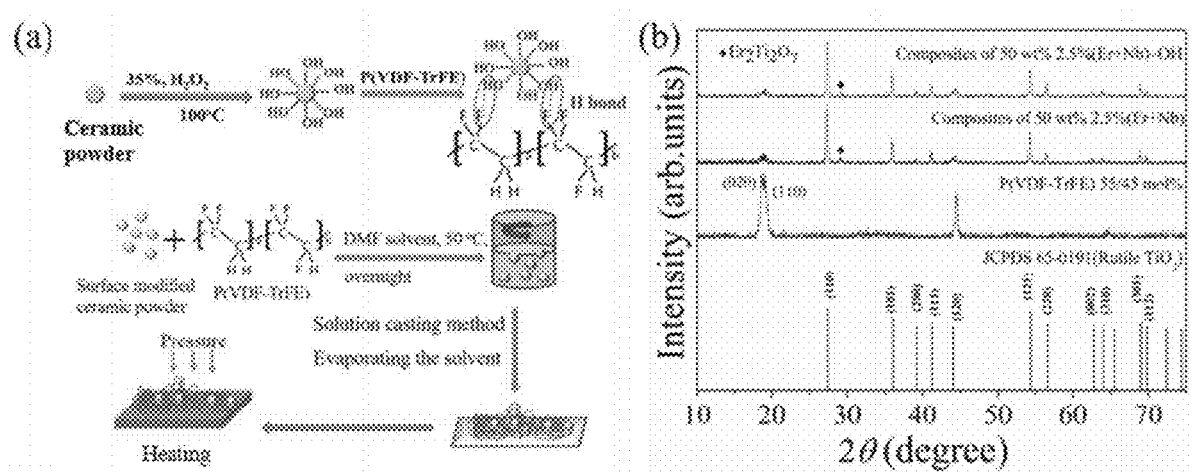
FIG. 1 depicts: (a) a schematic illustration of the hydroxylation of ceramic powders, formation of hydrogen bond and fabrication of ceramic/polymer composite; (b) XRD patterns of the as-synthesized P(VDF-TrFE) film, hot-pressed composite samples doped with 50 wt % of untreated and surface modified 2.5% (Er+Nb) ceramic fillers; (c) FTIR spectra in the ATR mode of the untreated and surface modified ceramic powders; and (d) TGA curves of the untreated and surface modified ceramic powders, the pure P(VDF-TrFE) film and composite film with 50 wt % 2.5% (Er+Nb)—OH ceramic fillers.
Figure 1:
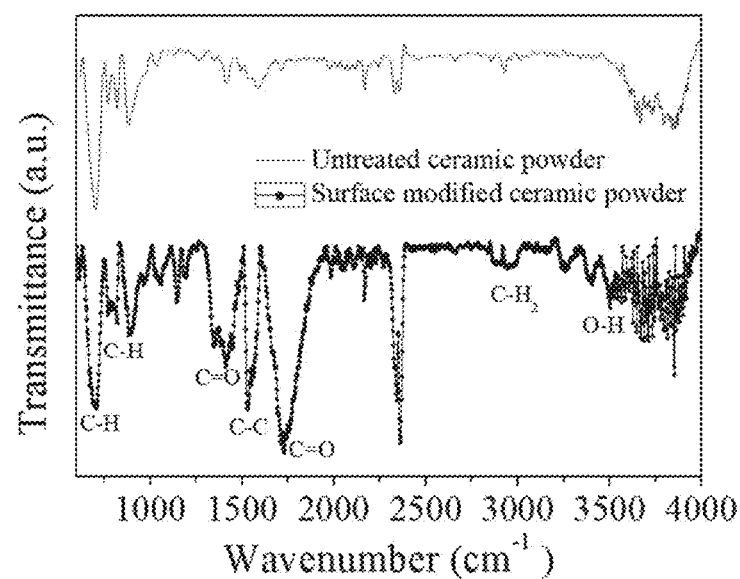
Figure 1:
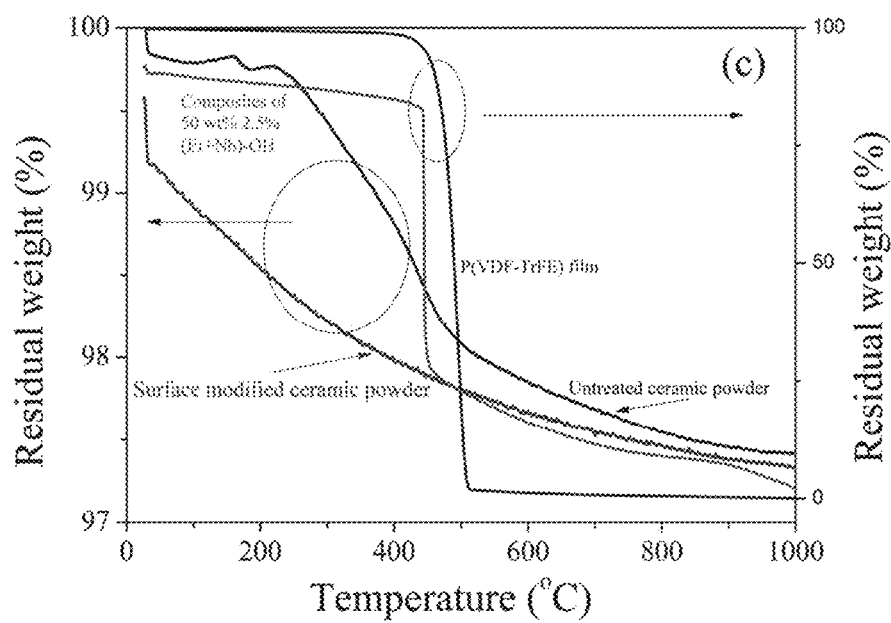

In the present invention, it is found that the CP behavior of rutile $TiO_2$ ceramics co-doped with metal ions, such as Nb and Er, exhibits high-performance dielectric behaviors, including temperature and frequency stable CP value ($10^4$-$10^5$) and sufficiently low dielectric loss (0.03). These results indicate a high reliability of the capacitors. Importantly, technology on the metal-ion doped $TiO_2$ ceramics are developed to multilayer-structured CP ceramic/polymer composite films, which can combine the advantages of ceramics (high dielectric permittivity) and polymers (high breakdown field strengths, easily fabricated into complex shapes, flexible and layer features). Surface hydroxylated ceramic fillers, embedded in copolymer matrix achieved high dielectric constant up to 300 and exceptional low dielectric loss down to 0.04 in the low frequency range, as well as a high energy density of 8.9 J/cm$^3$ at breakdown field of 82 MV/m. Therefore, these composite film capacitors have great technological potential for many applications. In microelectronic systems, thin-film dielectric with high capacitance due to its minimal thickness and being located close to the microprocessor can reduce inductance. Thin-film capacitors can increase the capacitive density and drastically reduce the capacitor area, offering performance, volume, and cost advantages over discrete ceramic capacitors.

The present invention provides:
(1) Strategy and design on incorporating metal-ion doped TiO$_2$ CP material into suitable polymer matrix such as poly(vinylidene fluoride trifluoroethylene) (P(VDF-TrFE)), whereby multilayer and flexible capacitors composed of the synthesized CP composites simultaneously demonstrating a large dielectric constant, a negligible dielectric loss and a relatively high energy density are obtainable;
(2) Fabrication processing of CP ceramic/polymer composite multilayers by combining solution casting and hot-pressing (HP) processes, thereby offering simple techniques for fabricating such composite multilayers; and
(3) Surface modification for improving compatibility in CP ceramic/polymer composites.

Before details of the present invention are provided, the problems solved by the present invention and the advantages thereof are provided.

Problems solved by the present invention:
The present invention is the first example to incorporate newly discovered metal ion-doped TiO$_2$ based CP materials into polymer matrix, which would be the first step towards the next generation of fully solid-state supercapacitor and high-energy-density storage devices. The problem of searching on CP material indicates that most of the heteroatomic substitutions that might be employed to improve one of the dielectric properties, always simultaneously worsen the dielectric performance of another. In fact, it is a challenge to satisfy the requirements of simultaneously possessing a high and breakdown strength in dielectric capacitors. In the present invention, the multilayer and flexible capacitors composed of the CP composites demonstrate simultaneously large dielectric constant, negligible dielectric loss, and relatively high energy density.

Compared to conventional ceramic materials, the composites disclosed in the present invention are lightweight, scalable and are easily fabricated into complex shapes towards miniaturization of the compact electronic and electrical systems. The additional flexibility feature of them also possesses broad application prospects in modern electronic and electrical devices; ranging from electric powered automobiles, drive trains and motors, to mobile communication devices and microwave generation.

The process disclosed in the present invention is relatively simple, low cost and mass production for the composite since the ceramic fillers in the composites are fabricated by conventional solid-state sintering method.

Advantages offered by the present invention:
Host titanium dioxide used in this colossal permittivity system is friendly to the environment, non-toxic and abundant.

The developed process, which is solution casting and hot-pressing technique, is relatively simple and low cost.

The developed process is suitable for mass production as the ceramic powders are fabricated by conventional solid-state sintering method. By contrast, fabrication processes for nano-size materials or core-shell nanostructure are usually complicated, and the production capacity might not suitable for mass production-scale.

The developed dielectric capacitors based on the composite multilayers present a relatively high dielectric constant with exceptional low loss. The maximum energy density achieved simultaneously is remarkable compared to those nanocomposites with other ceramic particle fillers. Such novel composite multilayers capacitors are expected to be greatly superior to conventional dielectrics currently used in systems.

Moreover, power electronics applications are currently limited by the capacitor size and performance. Multi-layered capacitors are easily patterned in principle and fully solid-state construction, offering many merits such as improved safety consideration when compared to conventional electrochemical construction.

High-performance dielectric materials are indispensable to advanced microelectronic and high-density energy storage systems. Particularly, tremendous demand for energy storage systems continues to grow, due to their potential applications in modern electronic and electrical industry; pulsed power generation and hybrid power systems [1-3]. Dielectric capacitors exhibit some advantages, including solid state construction, high power density, high operating voltage and long cycling lifetime compared to other energy storage devices. However, low energy density and large dissipation are the two major problems to hinder their practical application. In order to enhance the maximum stored energy density U (U=$\varepsilon_r\varepsilon_0 E_{max}^2$, where E is the electric breakdown strength, $\varepsilon_r$ and $\varepsilon_0$ are the material's relative permittivity or dielectric constant and the vacuum permittivity, respectively), ideal dielectric materials with sufficient low loss should have a high $\varepsilon_r$ and breakdown strength. Therefore, the exploration on alternative colossal permittivity (CP) based materials with low loss attracted increasing attention. Noted that CP ($\varepsilon_r$>10$^4$) and low loss (mostly <0.05) were found in (In+Nb) co-doped rutile TiO$_2$ ceramic bulks by Liu's group [4]. The dielectric properties are almost independent over a wide frequency and temperature range, which is superior to other earlier CP materials, such as CaCu$_3$Ti$_4$O$_{12}$, doped NiO, La$_{2-x}$Sr$_{rx}$NiO$_4$, and ferroelectrics.

It is known that conventional dielectric capacitors usually have an energy density less than 2 J/cm$^3$, which is mainly restricted by the low dielectric constants of polymers or low breakdown field of ceramics. To enhance the energy density of the dielectric capacitors, a great deal of effort has been put to explore on making ceramic/polymer composites [5-7]. It is believed that incorporating CP materials into polymer matrix would probably be the next generation of energy density storage devices [2]. Compared to the conventional ceramic materials, these composites with high energy-storage density are lightweight, scalable and are easily fabricated into complex shapes towards miniaturization of the compact electronic and electrical systems. The additional flexibility features of them also possess broad application prospects in modern electronic and electrical devices; ranging from electric powered automobiles, drive trains and motors, to mobile communication devices and microwave generation. Among the currently studied composite systems, high $\varepsilon_r$ ferroelectric ceramics, such as Pb(Mg$_{1/3}$Nb$_{2/3}$)

$O_3$—$PbTiO_3$ (PMN-PT), $Pb(Zr,Ti)O_3$(PZT) and $BaTiO_3$ (BTO) have been widely used as fillers in polymers [6, 8]. As they usually exhibit a strong electromechanical effect, a mechanical resonance in the device would be arisen during charging and discharging. This may limit the reliability of the device [5]. In addition, the $\varepsilon_r$ values of these materials are strongly dependent on the temperature in the vicinity of phase transition temperature [9]. Several emergent CP materials have also been proposed, such as $CaCu_3Ti_4O_{12}$ (CCTO) [5, 10], doped NiO, and $La_{2-x}Sr_xNiO_4$ in the past decade. However, these classes of materials are not ideal for straightforward application. They commonly showed a relative large dielectric loss leading to energy leaking out, and the breakdown strength was unclear. Stimulated by our previous studies on CP materials [11-13], it is anticipated that the development of the CP $TiO_2$/polymer composites might further light on the practical energy storage since excellent dielectric properties have been found in the CP ceramics co-doped by different metal-ions in our studies. Unfortunately, there is no report on the above aspects with $TiO_2$-based CP composite materials. It is well known that the large dielectric difference between ceramic fillers and polymer matrix exhibiting inhomogeneous electric field would weaken the breakdown strength of the composites. Besides, agglomeration and phase separation from the matrix might deteriorate the electrical performance of the composites. As a result, surface modification is highly desirable to help improve compatibility in ceramic/polymer composites. In fact, dielectric properties of composites are strongly dependent on filler concentration, surface activity and its distribution in polymer matrix.

Here, the present invention discloses ceramic/polymer composite multilayers by combining solution casting and hot-pressing (HP) processes. Solution casting offers opportunity for high reliability and low cost manufacturing, while HP method reduces voids and other structural defects in composites. The poly(vinylidene fluoride trifluoroethylene) (P(VDF-TrFE)) 55/45 mol % copolymer was utilized as matrix. It has very weak piezoelectric effect and a high dielectric constant (~15) at room temperature due to the high polarity from fluorine with high electronegativity. (Er+Nb)-modified $TiO_2$ was used as ceramic fillers. It is recognized that the fluorine atom presented in the polymer can strongly interact with $Ti^{4+}$ ions through dipole-dipole interaction. The surface of ceramic fillers was chemically modified by $H_2O_2$ to introduce hydroxyl groups. The results indicate that surface hydroxylated composite with a dense structure can effectively enhance dielectric properties. Finally, high-performance of dielectric capacitors simultaneously possessing large dielectric constant, negligible dielectric loss and highest energy density among the previously reported components are successfully achieved in the flexible multilayered composites.

Figure 5:
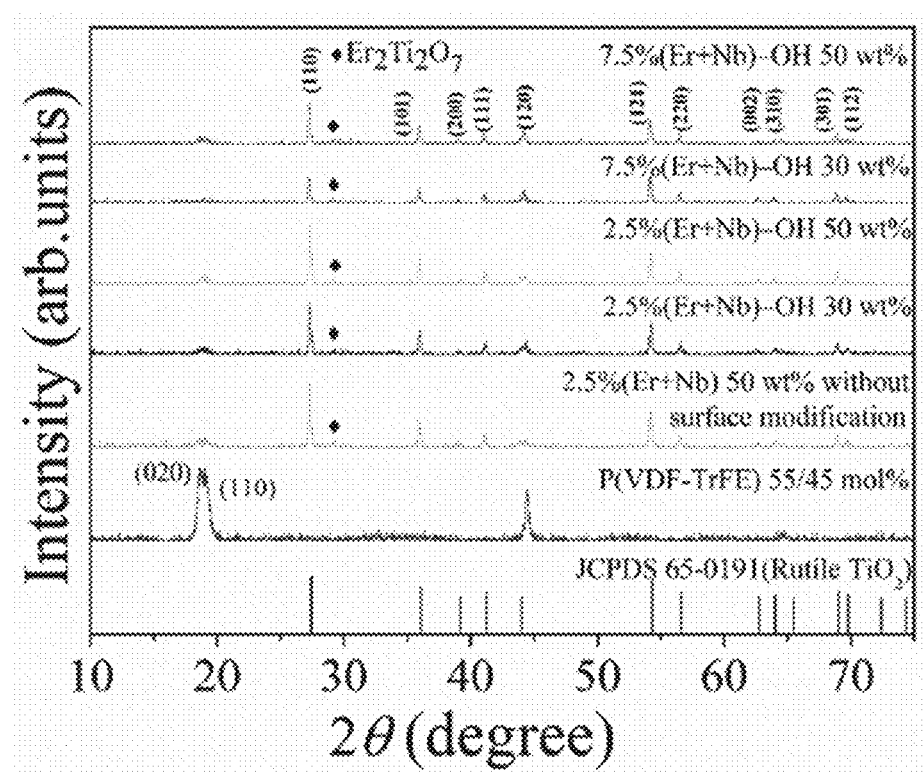
FIG. 5 depicts XRD patterns of the as-synthesized P(VDF-TrFE) film and hot-pressed composite samples doped with different weight ratios of 2.5% and 7.5% (Er+Nb)—OH.
Figure 6:
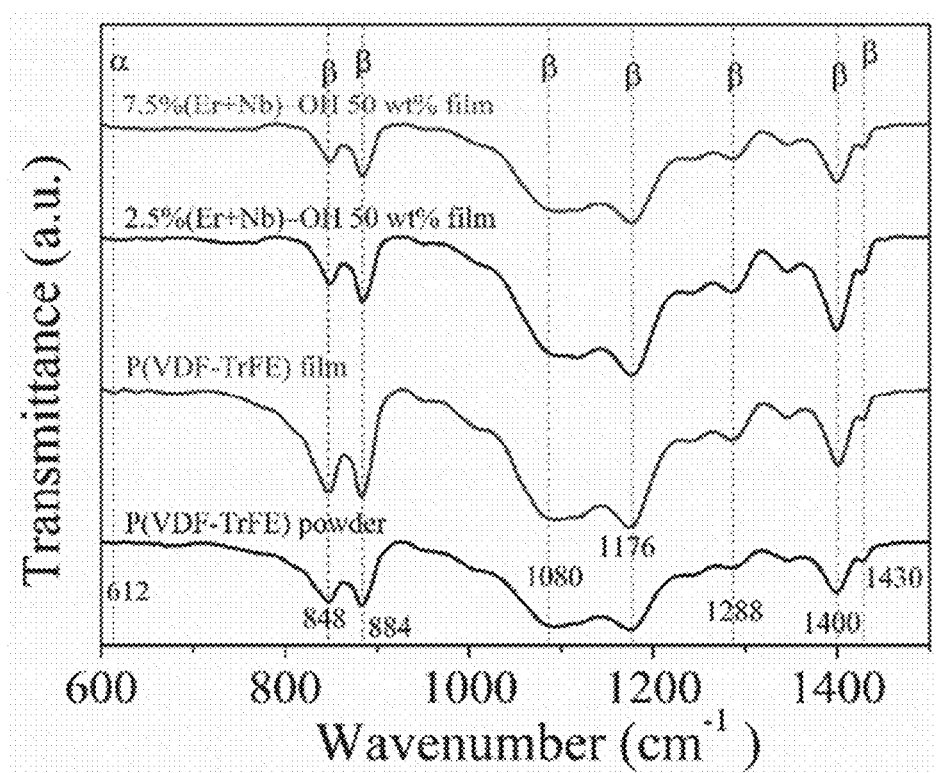
FIG. 6 depicts FTIR spectra in the ATR mode of the pure P(VDF-TrFE) powder, as-synthesized P(VDF-TrFE) film and hot-pressed composite samples doped with different weight ratios of 2.5% and 7.5% (Er+Nb)—OH, where the arrows in the figure indicate the characteristic absorption bands of the α and β phase structure.

FIG. 1a shows the schematic illustration of the hydroxylation of ceramic powders, formation of hydrogen bond in (Er+Nb) co-doped $TiO_2$/P(VDF-TrFE) composites and the fabrication of ceramic/polymer composite films. X-ray Diffraction (XRD) patterns of the various samples are presented in the 2θ range from 10° to 75° (FIG. 1b). As-synthesized P(VDF-TrFE) film showed broad peak centered at around 2θ=19°. This indicates the coexistence of crystalline non-polar α and polar β phases of the P(VDF-TrFE) copolymer, corresponding to the orientation planes of (020) at 18.7° and (110) at 19.2°, respectively [14]. The intensities of copolymer peaks for two hot-pressed composites were suppressed by strong peaks of ceramic structure. Similar to the previous work [15], the inorganic component exhibited an increased lattice strain and a small amount of secondary phase of $Er_2Ti_2O_7$ was found in the composites. It is worth emphasizing that the rutile $TiO_2$ phase was unchanged in the composites for both untreated and surface modified 2.5% (Er+Nb) ceramic fillers. Fourier transform infrared (FTIR) spectra in the ATR mode of the untreated and surface modified ceramic powders are shown in FIG. 1c, ranging from 600 to 4000 $cm^{-1}$. Absorption bands of OH groups at around 3400 $cm^{-1}$ confirms the surface modification of ceramic powders [16], attributed to O—H stretching. This result indicates that hydroxyl is introduced onto the surface of ceramic powder after treatment with $H_2O_2$. The peaks at 690-900 $cm^{-1}$, 1440/1700 $cm^{-1}$, and 1528 $cm^{-1}$ are assigned to aromatic CH, C=O stretching, and C—C in-plane vibration of the copolymer, respectively. It is noticed that all intensity of vibrational stretching corresponding to the surface modified ceramic powders is enhanced. FIG. 1d provides another evidence of the presence of the hydroxyl groups. There is a difference in the weight loss between the untreated and surface modified ceramic powders. The weight loss of the (Er+Nb)—OH is larger than that of the untreated one, which could be attributed to the vaporization of the hydroxyl groups [7]. The finding implies that the hydroxyl groups are successfully introduced into the surface of the ceramic powder as a relatively large weight loss before 300° C. It is seen that both weight of P(VDF-TrFE) film and composite film with 50 wt % 2.5% (Er+Nb)—OH ceramic fillers are relatively stable below 450° C. However, there is an obvious weight loss and decomposition for the copolymer at around 500° C., whereas composite exhibits better stability behaviors, owing to the presence of ceramics fillers in copolymer matrix. XRD patterns and FTIR spectra of a series of composites are displayed in the supporting information (FIGS. 5 and 6).

Figure 2:
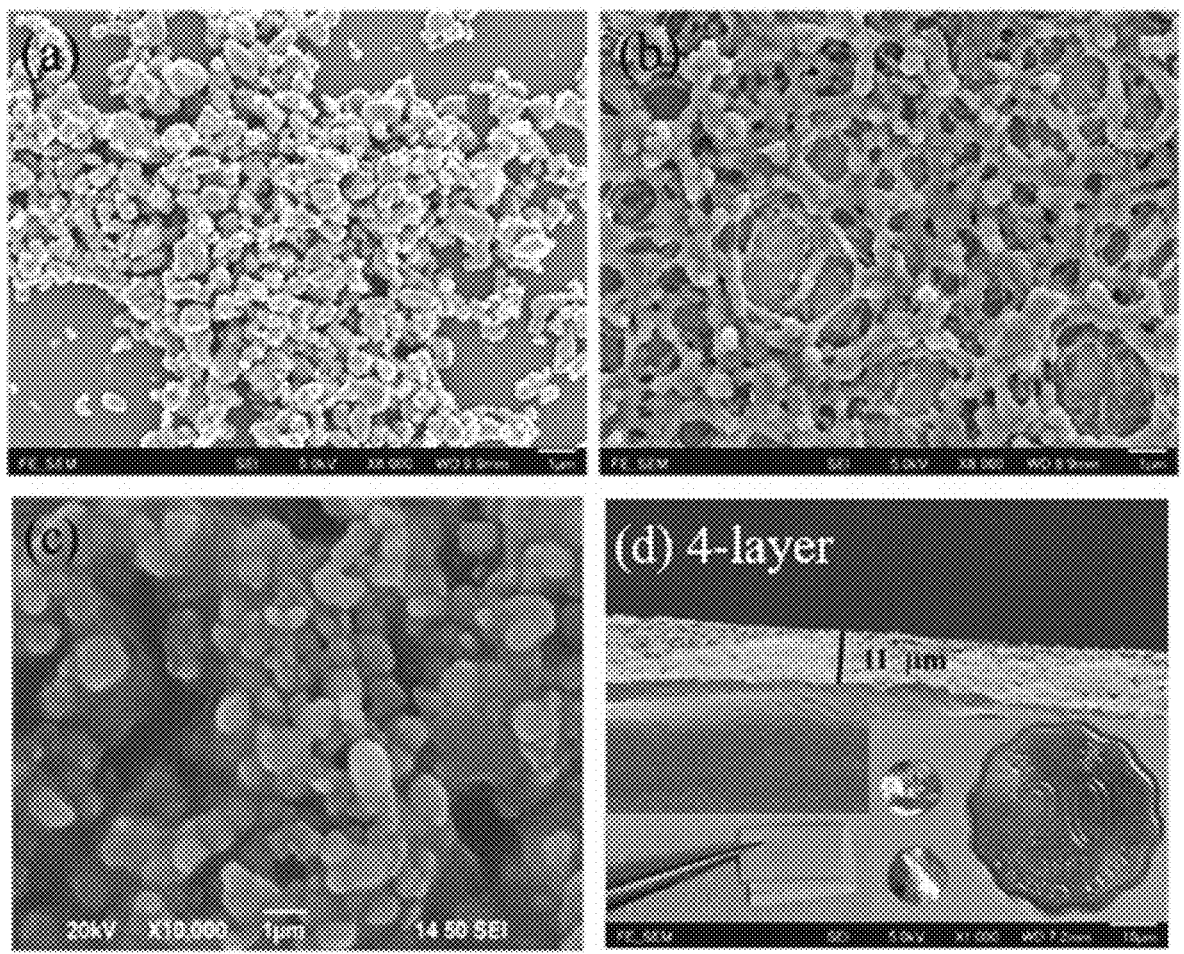
FIG. 2 depicts: (a) FESEM image of the (Er+Nb) co-doped rutile $TiO_2$ ceramic powders; (b) surface morphology of composite filled with the untreated ceramic powders; (c) filled with surface modified ceramic powders; and (d) 4-layer as solution-cast composite film after HP process, inset: photograph of the flexible composite film and composite samples with sputtered golden electrode layer composite samples.
Figure 7:
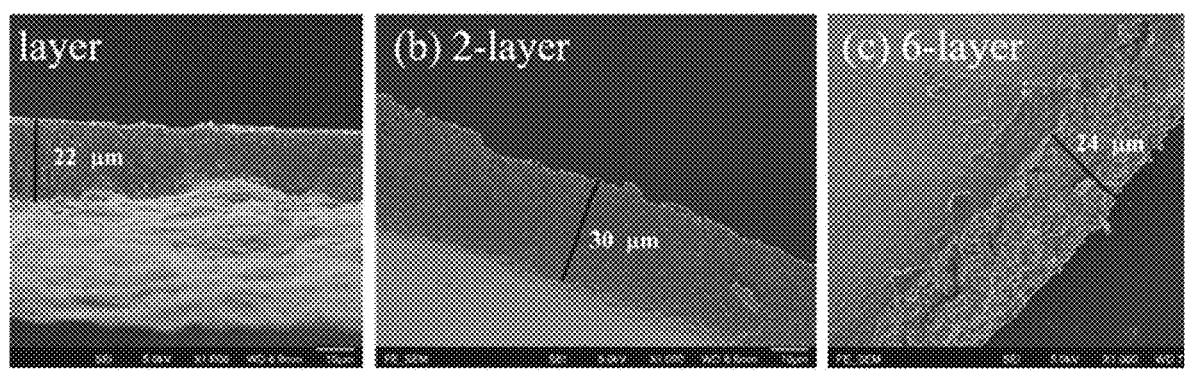
FIG. 7 depicts cross-sectional FESEM images of composites 2.5% (Er+Nb)—OH with 50 wt % ceramic fillers prepared under different condition: (a) as solution-cast composite film; (b) 2-layer as solution-cast composite film after HP process and (c) 6-layer as solution-cast composite film after HP process.

A spherical morphology is shown in the ceramic powders, with an average size of about 1 μm (FIG. 2a). Field emission scanning electron microscopy (FESEM) was used to investigate the possible origin in respect of microstructure and surface morphology of the specimens. By comparing FIGS. 2b and 2c, the composite of (Er+Nb)—OH shows better combination with P(VDF-TrFE) than the untreated one, which is similar with the previous report [17]. This result illustrates the surface hydroxylation not only facilitates uniform dispersion of ceramic particles in the polymer matrix, less voids and pinholes in the composites, but also benefits for forming strong interfacial adhesion with the polymer matrix. More importantly, surface modification could promote the accumulation of charge carriers at an interface, offer stronger interfacial polarization, and enlarge the mean electric field acting on ceramic particles. This would be helpful for obtaining high-energy storage density of the composite as illustrated in a later section. Composites were hot pressed for improving the uniformity and avoiding the pinholes. The composite filled with untreated ceramic powders was also prepared under identical procedure for comparison. A sandwich configuration was used to form a stack of multilayers [10]. FIG. 2d shows that 4-layer composite film containing 50 wt % 2.5% (Er+Nb)—OH ceramic fillers has a better uniformity and denser structure than 1, 2, and 6-layer composites; the inset is a photograph of the flexible composite film and layer composite samples coated by sputtered golden electrode. The thickness of the sample was 11 μm. While 1, 2, and 6-layer of as solution-cast composite in the HP process were 22, 30 and 24 μm thick, respectively (FIG. 7). These findings imply that the thickness of composite films does not have an upward tendency due to the optimum condition of HP process.

Figure 3:
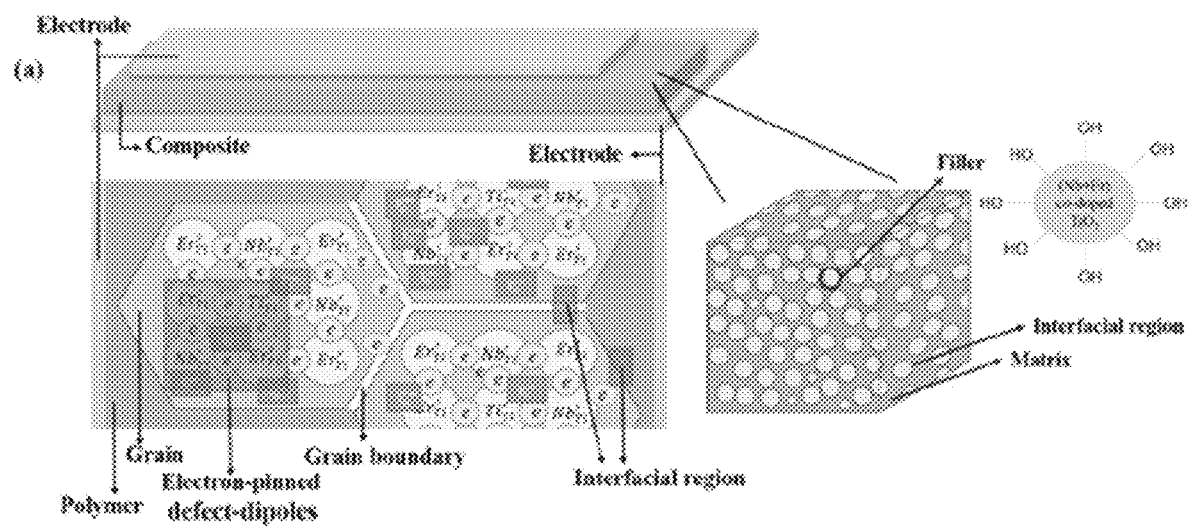
FIG. 3 depicts: (a) a schematic drawing of the (Er+Nb) co-doped $TiO_2$/P(VDF-TrFE) composite model with labeling; (b) dielectric permittivity, (c) loss as a function of frequency from 100 Hz to 100 kHz for 2.5% (Er+Nb) co-doped $TiO_2$ ceramic, 4-layer HP composites filled with surface modified or untreated with 50 wt % 2.5% (Er+Nb) ceramic fillers and pure copolymer film; and (d) comparison of experimental and theoretical dielectric permittivity of the composites films at 1 kHz and at room temperature as a function of 1, 4-layer HP surface modified composites with 50 wt % 2.5% (Er+Nb)—OH ceramic fillers.
Figure 3:
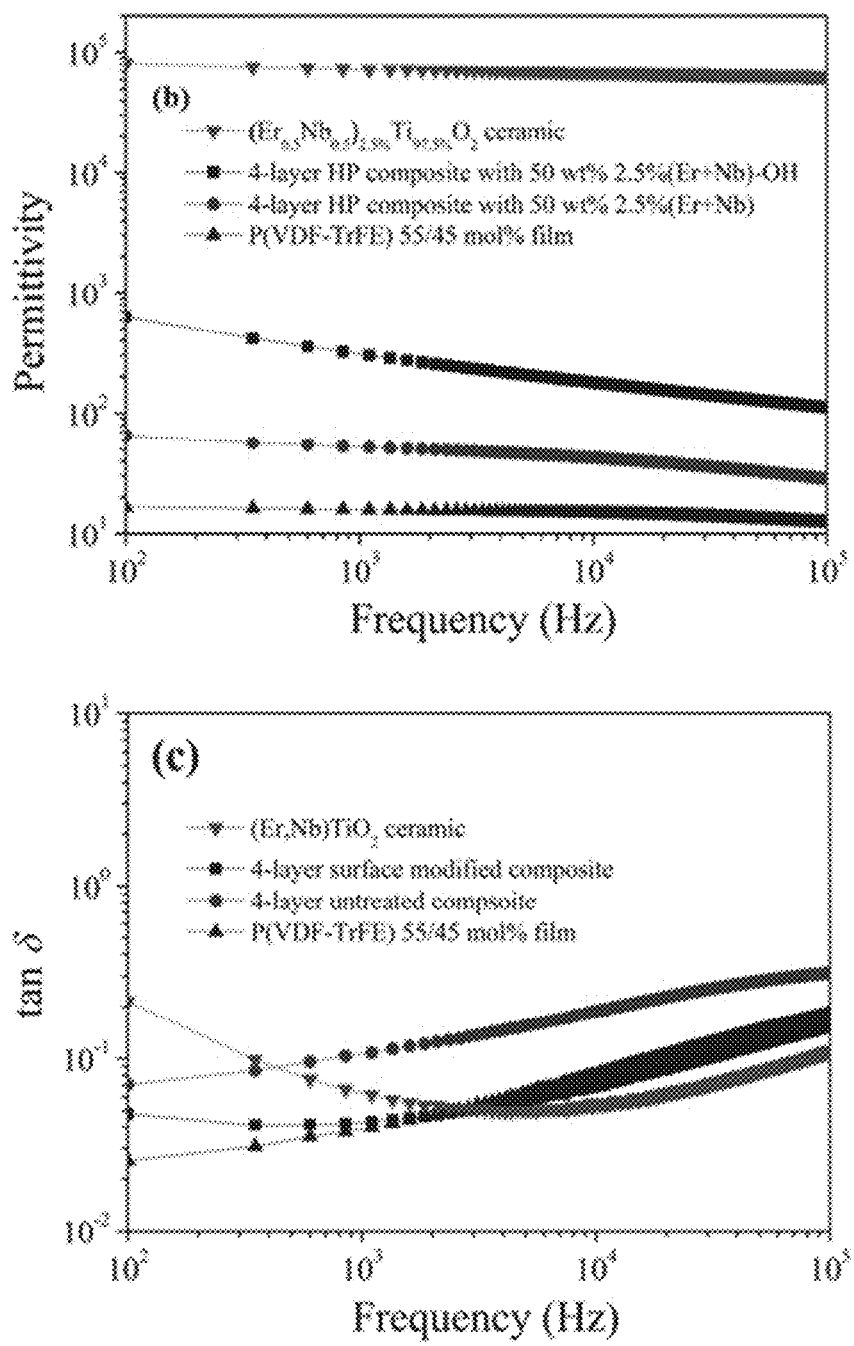
Figure 3:
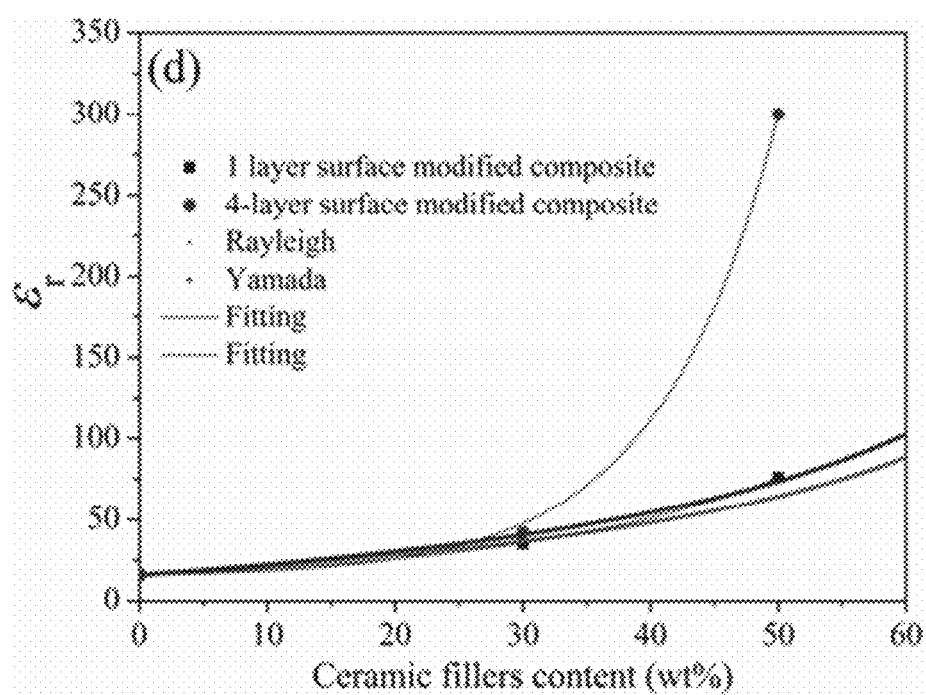

FIG. 3a shows schematic of the (Er+Nb) co-doped $TiO_2$/P(VDF-TrFE) composite model with labeling. Spherical hydroxylated 2.5% (Er+Nb) co-doped $TiO_2$ ceramic fillers were dispersed homogeneously in P(VDF-TrFE) matrix. Simple inner structures of composite are described in the figure [4, 15, 18]. It is reported that CP as well as low loss in dielectric materials are the consequence of the formation of defect-dipole complex [4]. It is then reasonable that the $\varepsilon_r$ of composites is between that of the ceramic ($\varepsilon_r \sim 10^4$) and pure copolymer ($\varepsilon_r \sim 16$) one. Among the fabricated series (FIGS. 8a to 8d, Supporting information), an excellent dielectric property was achieved in the 4-layer HP composite filled with 50 wt % 2.5% (Er+Nb)—OH ceramic fillers, where $\varepsilon_r$ and tan δ were measured to be 300 and 0.04 at 1 KHz, respectively (FIGS. 3a and 3b). As expected, the $\varepsilon_r$ of the surface modified composite was significantly higher than that of the untreated one. For example, at the same frequency, the $\varepsilon_r$ of 4-layer untreated composite only reached about 52. Furthermore, the tan δ was reduced significantly over all frequencies through modifying the surface of ceramic powders in the composites. The results illustrate that both satisfactory $\varepsilon_r$ and low tan δ are accomplished in the homogeneous film. All composites suspended (Er+Nb)—OH had larger dielectric constants with lower losses than those with the untreated one (FIGS. 9a and 9b). The $\varepsilon_r$ of the composites remained stable in the lower frequency range, and then decreased in the higher frequency range, especially for the composites filling with 50 wt % ceramic fillers. It is reported that the decrease of $\varepsilon_r$ at high frequency is mainly caused by the reduction in Maxwell-Wagner-Sillars (MWS) polarization and space charge polarization [5]. All the specimens have acceptable dielectric loss which slightly increases in the higher frequency range. The influence of the wt % value of ceramic fillers and numbers of layers by HP was also be investigated [19]. It is reasonable that the $\varepsilon_r$ of the composites increased with the weight of the ceramic fillers. Importantly, tan δ magnitudes of composites filled with 50 wt % ceramic fillers are much lower than those obtained from other samples (FIGS. 8b and 8d). It should be pointed out that the value of $\varepsilon_r$ is significantly enhanced with the number of layers in HP process, then saturates and finally drops. These results imply that when the number of layers used in the HP increases, the interfacial interaction between the polymer matrix and ceramic fillers should also be considered for the dielectric permittivity [5, 10]. In addition, tan δ would be still within an acceptable range found in most composites. Temperature dependence of dielectric behaviors of the 1 and 2 layers composites with 2.5% (Er+Nb)—OH ceramic fillers, is displayed in supporting information (FIGS. 10a and 10b), measured at 1 KHz and 10 kHz. It is observed that the value of $\varepsilon_r$ can reach its maximum at 70° C., corresponding to the phase transformation temperature between the ferroelectric and paraelectric phases for the P(VDF-TrFE) 55/45 mol % polymer matrix [5].

Figure 11:
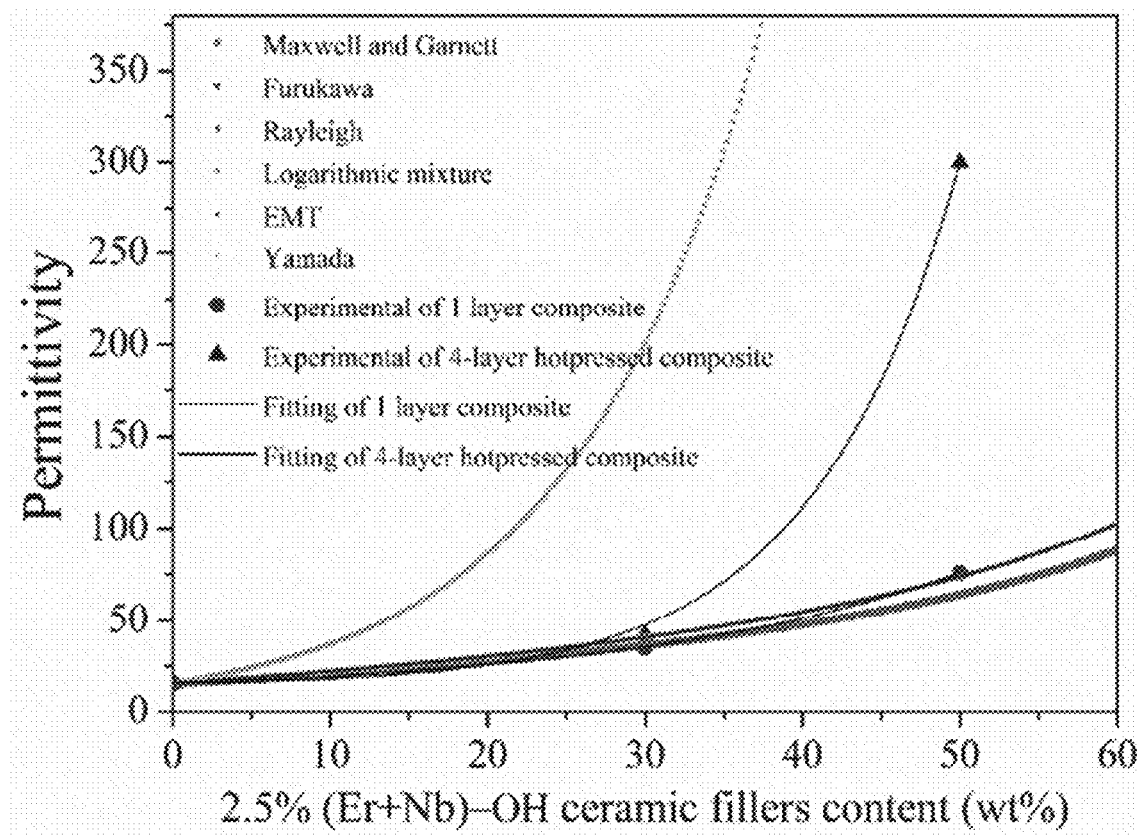
FIG. 11 depicts a full set for comparison of experimental and theoretical dielectric permittivity of the composites films at 1 kHz and room temperature as a function of 1, 4-layer HP composites with 50 wt % 2.5% (Er+Nb)—OH ceramic fillers.

Such large dielectric constants in the ceramic/polymer composites were previously described by some effective medium theory. The effective dielectric constants ($\varepsilon_{eff}$) of 1 layer and 4-layer HP surface modified composites are depicted in FIG. 3d with the relevant experimental values. Detailed descriptions are presented in supporting information (FIG. 11). In the present work, our experimental values are in close agreement with Yamada model by taking into account the shape factor n [20]. The n value is found to be 3.6 as obtained from the best fit result. It was claimed that an n value of 3.5 was applicable to PZT with the particle size of 1.5 μm reported by Gregorio et al. [21], which is consistent with our results of 1 μm from the ceramic fillers. However, the experimental $\varepsilon_r$ of 4-layer HP composites under higher concentration of surface modified ceramic fillers deviates from all models. The possible reason is that interfacial physical and chemical properties of composites have not been taken into account in the models based on effective medium theory. Thus, the interfacial effect of the composite needs to be further studied in detail. It should be concluded that $\varepsilon_{eff}$ of composite material is not only dependent on $\varepsilon_r$ of the polymer and the fillers, size and shape of the fillers and the volume fraction of the fillers, but also on the interphase region and layers under the influence of HP [22]. These aspects are essential to be considered for fabricating composites with improved dielectric properties.

Figure 4:
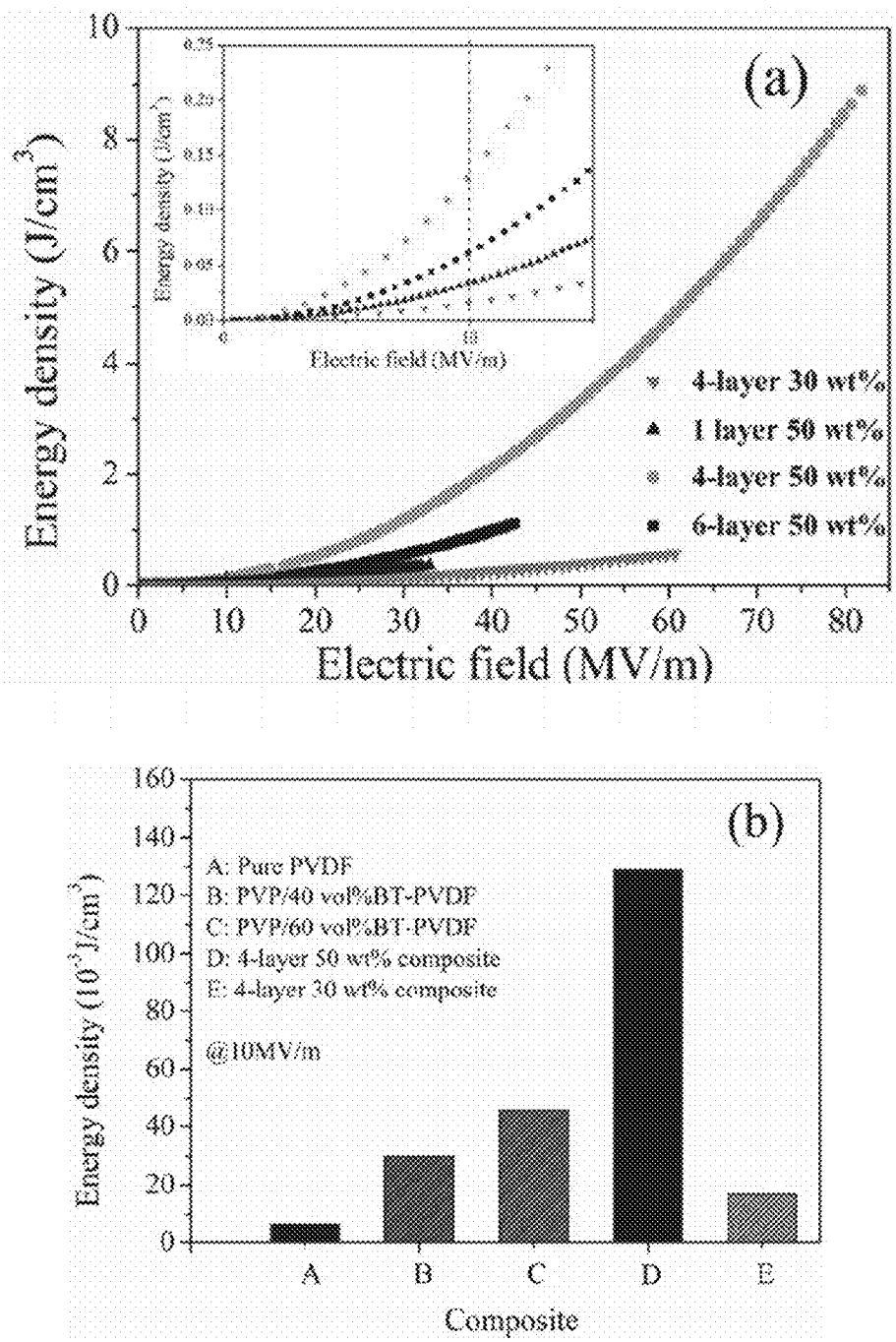
FIG. 4 depicts: (a) plots an energy density as a function of applied field of different layers composites filled with various wt % 2.5% (Er+Nb)—OH ceramic fillers, the inset being a magnification of lower part of applied field; and (b) the comparison of energy density at 10 MV/m between a previous work (Sample A to C) and our work (Sample D and E).

In fact, it is a challenge to satisfy the requirements of simultaneously possessing a high $\varepsilon_r$ and breakdown strength in dielectric capacitors. The HP composites may be promising candidates for practical applications of electric energy storage devices since they exhibit large dielectric constant and low loss as shown in FIGS. 3a and 3b. In FIG. 4a, the energy density as a function of the applied field in the composites is calculated based on the equation $U=\frac{1}{2} \times \varepsilon_r \varepsilon_0 E_{max}^2$. The 4-layer composite with 50 wt % 2.5% (Er+Nb)—OH ceramic fillers exhibited the largest breakdown strength (82 MV/m), whereas the sample with 30 wt % was 60 MV/m. In addition, the energy density was found to increase with enhancing electric field. Among them, 4-layer HP composite with 50 wt % 2.5% (Er+Nb)—OH ceramic fillers can reach up to the highest energy density with a value of 8.9 J/cm³ under 82 MV/m. This should be attributed to the increase in both dielectric constant and electric field strength. This value is much higher than that of the pure PVDF (2.8 J/cm³) at 400 MV/m. More importantly, the finding implies that HP method could improve the breakdown strength of the composite films. Compared with different layers of composite with 50 wt % 2.5% (Er+Nb)—OH ceramic fillers, 1 layer without HP composite shows the lowest breakdown strength and energy density. The FESEM images (FIGS. 12a and 12b, Supporting information) display the surface morphology of HP and without HP composite film with 50 wt % 2.5% (Er+Nb)—OH ceramic fillers, revealing that HP method could decrease the defects such as voids in the composites. This brings on the homogenous distribution of ceramic fillers in the polymer matrix and the improvement of the breakdown strength of the composites. Actually, breakdown strength is strongly influenced by the morphology of ceramic fillers, interface areas, agglomerations, increasing air voids, and the large difference of the dielectric constant between the ceramic fillers and the polymer [23]. In fact, the level of the breakdown field is difficult to predict and no systematic thickness dependence of the breakdown field is observed in the 0-3 composites. To further make a clear comparison of energy density, FIG. 4b demonstrates energy density at 10 MV/m between our study and previous work [17]. It is suggested that the lower electric field (not excess 10 MV/m) is more valuable for practical use when considering the reliability and stability of device [24]. Our sample D achieved the highest energy-density storage, which is almost 19 times compared with the pure PVDF [17]. Table 1 summarizes some performance parameters of previously reported composites measured at room temperature and 1 kHz in order to compare and evaluate the potential of our achieved samples for energy storage.

TABLE 1

Comparison of the composite performances at room temperature and 1 kHz for energy storage

| | Materials | $\varepsilon_{eff}$ | tan δ | Breakdown Strength (MV/m) | Calculated maximum energy density (J/cm³) | Ref. |
|---|---|---|---|---|---|---|
| Nanocomposites with ceramic particle fillers | 10 vol % TiO$_2$/P(VDF-TrFE-CTFE) | 43 | <0.1 | 200 | 6.9 | [30] |
| | BCT$^{a)}$/P(VDF) | 35 | <0.1 | 175 | 4.72 | [31] |
| | BZT$^{b)}$/P(VDF) | 28 | <0.1 | 250 | 7.74 | [31] |
| | 5 vol % BST$^{c)}$/PVDF | 10 | <0.03 | 250 | 3.9 | [7] |
| | BTO/P(VDF) | 15 | <0.1 | 225 | 3.24 | [31] |
| | 30 vol % BTO/P(VDF-TrFE-CTFE) | 50 | <0.25 | 150 | 7 | [32] |
| | 50 vol % BTO/P(VDF-HFP) | 43 | 0.0 | 210 | 6.1 | [33] |
| | 3 vol % BTO/P(VDF) | ~40 | 0.03 | 183 | 4.2 | [34] |
| | Sandwich-Structured 20 vol % BTO/PVDF | ~18 | <0.05 | 470 | 18.8 | [29] |
| Nanocomposites with nanofibers | 3 vol % BZT-BCT NFs/PVDF | ~13 | <0.02 | 310 | ~7.86 | [35] |
| | 3 vol % BTO@TiO$_2$ nanofibers/PVDF | — | — | 646 | 20 | [25] |
| Emergent CP Materials-based composites | 50 vol % CCTO/P(VDF-TrFE) | 610 | <0.4 | — | — | [5] |
| | 50 vol % CCTO/P(VDF-TrFE) | 62 | 0.05 | — | — | [10] |
| | CCTO/PI | ~40 | <0.2 | — | — | [26] |
| | 50 wt % (Er,Nb)TiO$_2$/P(VDF-TrFE) | 300 | 0.04 | 82 | 8.9 | Our work |

$^{a)}$(Ba,Ca)TiO$_3$;
$^{b)}$(Ba,Zr)TiO$_3$;
$^{c)}$(Ba,Sr)TiO$_3$

It can be observed that using ferroelectric ceramics as ceramic fillers exhibits higher breakdown strengths, but generally results in lower dielectric constant. In the present work, CP ceramic fillers are utilized and hence the maximum energy density achieved is remarkable compared to those nanocomposites with other ceramic particle fillers. It is reported that using microsized particle might have a higher dielectric constant compared to employing the nanosized one [10, 17]. In recent years, many studies have focused on the introduction of controllable morphology fillers, such as large-aspect-ratio fibers [25, 26] for achieving great enhancements in both polarization and breakdown strength. Furthermore, some effective approaches have been proposed via adopting the strategy of a core-shell structure for the inorganic fillers [27] and modulating the multilayer structure of ceramic/polymer composites [28], which can weaken interfacial polarization and thus reduce the energy loss for improving the energy efficiency of the composites Earlier studies showed that ultrahigh energy density of polymer nanocomposites was achieved in a sandwich-structured 20 vol % BTO/PVDF and 3 vol % BTO@TiO$_2$ nanofibers/PVDF, in which the energy density was 18.8 J/cm³ [29] and 20 J/cm³ [25], respectively. However, the fabrication process for nano-size materials or core-shell nanostructure is usually complicated, and the production capacity might not suitable for mass production-scale. Apparently, the process developed in the present work is relatively simple, low cost and mass production for the composite since the ceramic powders are fabricated by conventional solid-state sintering method. For CP-based composites, although 50 vol % CCTO/P(VDF-TrFE) exhibited a large dielectric constant, 610 [5], but unfortunately it displayed a relatively high loss above 0.1 as well, causing a major problem of energy leaking out in dielectric capacitor. Besides, the properties of breakdown strength and energy storage are unknown in these earlier studies. In contrast, our developed dielectric capacitors based on the novel composite multilayers present a relatively high $\varepsilon_r$ with exceptional low tan δ, and a high energy density with a suitable breakdown strength simultaneously. It is believed that the approach of this study can be extended to other types of composites to achieve high-energy storage density. Moreover, power electronics applications are currently limited by the capacitor size and performance. Multilayered capacitors are easily patterned in principle and fully solid state construction, offering many merits such as improved safety consideration when compared to conventional electrochemical construction.

In summary, this invention shows composite capacitors with metal-ions co-doped CP materials and polymers. As an example, the multi-layer structured composites composed of P(VDF-TrFE) and surface functionalized ($\varepsilon_r$,Nb) TiO$_2$ ceramic fillers with homogeneous ceramic particle dispersions were prepared by practical solution-cast and hot pressing method. We found that the surface hydroxylation of ceramic fillers benefits dielectric properties, breakdown strength and energy storage densities of the composites. The enhanced energy storage density is attributed to the combined effects of surface modification by H$_2$O$_2$, improved dielectric constant and breakdown strength of composite films. The measurements have been compared with classical models and our experimental results are in good agreement with theoretical calculations. Importantly, the multilayered capacitors reported in this work can increase the capacitive density and drastically reduce the capacitor area, offering high-performance, volume cost advantages over discrete ceramic capacitors. The research results are helpful for not only investigating the fundamental dielectric properties of the composite materials, but also developing device applications in advanced microelectronics and high-density energy storage system.

Examples

Ceramic/polymer composite samples were fabricated by combining solution casting and HP method. The synthesis of ceramic powders (Er$_{0.5}$Nb$_{0.5}$)$_x$Ti$_{1-x}$O$_2$ can be found in our previous reports [15, 11]. The sintered ceramic powders were dispersed in an aqueous solution of hydrogen peroxide (H$_2$O$_2$, 35% w/v, Acros Organics) with stirring and heating at 100° C. for 3 h. The suspensions were subsequently centrifuged at 3000 rpm for 5 min. The collected powders were washed with distilled water and ethanol. Finally, surface hydroxylated ceramic powders ((Er+Nb)—OH) were obtained by drying overnight at 70° C. in an oven. P(VDF-TrFE) 55/45 mol % copolymer powder purchased from Piezotech was utilized as the matrix. To begin with, P(VDF-TrFE) copolymer powder was dissolved in a dimethylformamide (DMF) without further purification to obtain a solution with 10 wt % concentration. Different weight ratios (0 wt %, 30 wt % and 50 wt %) of 2.5% (Er+Nb)—OH or 7.5% (Er+Nb)—OH were ultrasonically dispersed in DMF and then introduced into P(VDF-TrFE) solution with constantly stirring at 50° C. for 8 h and sonicated for about 30 min to form stable suspensions. As-deposited composite film was subsequently dried on a hotplate at 70° C. The film was annealed at 120° C. overnight in an oven and then allowed to cool to room temperature. To improve the uniformity, the solution-cast film was then hot-pressed at 200° C. for 10 min. 2-, 4-, 6-layers solution-cast films could be finally obtained [5]. Gold layers were deposited on the films by sputtering to serve as electrode layers for electrical measurements.

X-ray Diffraction (XRD, Smart Lab; Rigaku Co., Japan), The Bruker Vertex-70 Fourier transform infrared (FTIR) spectrophotometer, field emission scanning electron microscopy (FESEM) was used for material morphology and crystal structure characterization. An impedance analyzer (HP 4294A; Agilent Technologies Inc., Palo Alto, CA) was used to measure the frequency dependence of the dielectric properties over the range of $10^2$ to $10^5$ Hz at room temperature. The temperature-dependent dielectric properties (298-413 K) were conducted inside a Carbolite furnace connected to the impedance. A high voltage power supply (model P0621, TREK, Inc.) was used for the breakdown strength measurement. All samples were kept inside a 400 mL beaker filled with silicon oil to limit moisture influence on testing results and sparking while applying high voltage. Energy density of the composites was calculated according to their dielectric constant and breakdown strength with different weight ratios of ceramic fillers.

FIG. 5 shows XRD patterns of the as-synthesized P(VDF-TrFE) film and hot-pressed composite samples doped with different weight ratios of 2.5% and 7.5% (Er+Nb)—OH.

FIG. 6 illustrates several phases associated intense bands, with 848 and 1288 $cm^{-1}$ attributing to the $CF_2$ symmetric stretching with the dipole moments parallel to the polar b axis. The 1400 $cm^{-1}$ band was assigned to the $CF_2$ bending mode within TTT segments of the chain and the wagging vibration of $CH_2$[16]. Moreover, the characteristic absorption bands at 1080 $cm^{-1}$ (C—C stretching band), 1288 $cm^{-1}$ (trans band), and 1430 $cm^{-1}$ ($CH_2$ bending) were attributed to the all-trans β conformations. The peak at 612 $cm^{-1}$ was belonged to the α phase (in-plane bending or rocking), showing in the pure P(VDF-TrFE) powder and film. However, the peaked value was decreased in the HP composite samples. The findings demonstrate that all polymer based samples have the similar characteristic absorption bands in FTIR.

The images in FIG. 7 show the cross-sectional FESEM images of the composites.

The ceramic fillers were homogeneously dispersed in the polymer matrix. The thickness of the composites film prepared under different condition, as solution-cast composite film, 2 and 6-layer as solution-cast composite film after HP process were 22, 30 and 24 μm, respectively.

Figure 8:
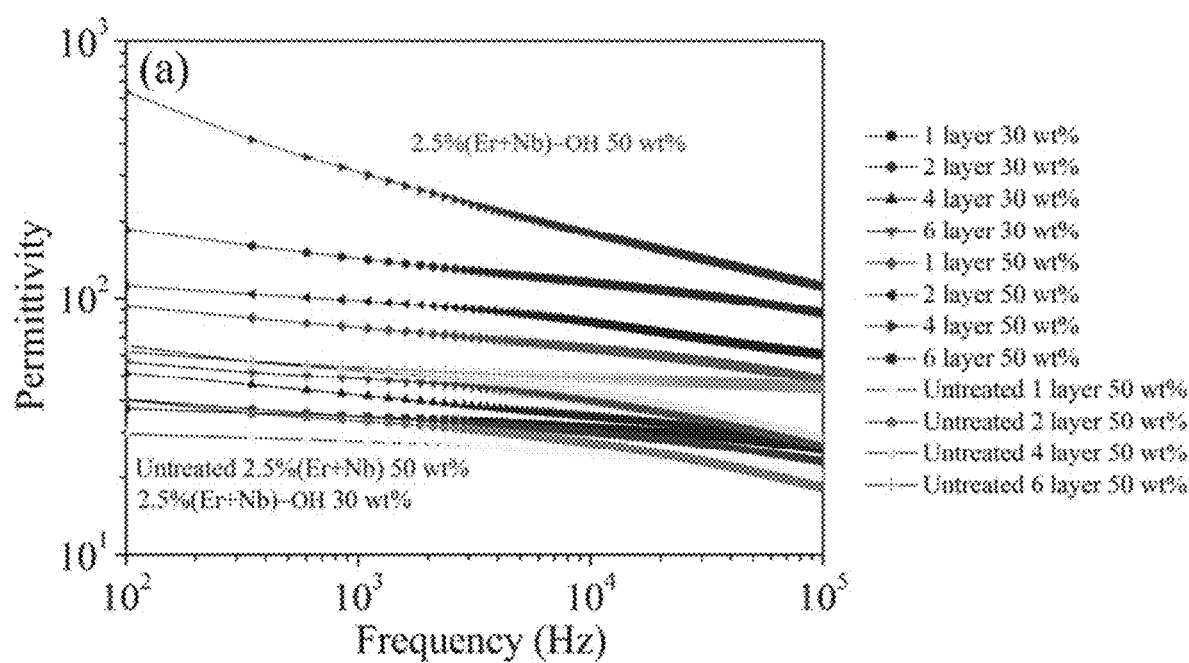
FIG. 8 depicts: (a and c) dielectric permittivity; and (b and d) loss as a function of frequency from 100 Hz to 100 kHz for various composite films. The different content of the (Er+Nb) co-doped rutile $TiO_2$ and ceramic fillers are specified in the figure, "1 layer" composite is the same as one shown in FIG. 9. Other composites are the hot-pressed samples.
Figure 8:
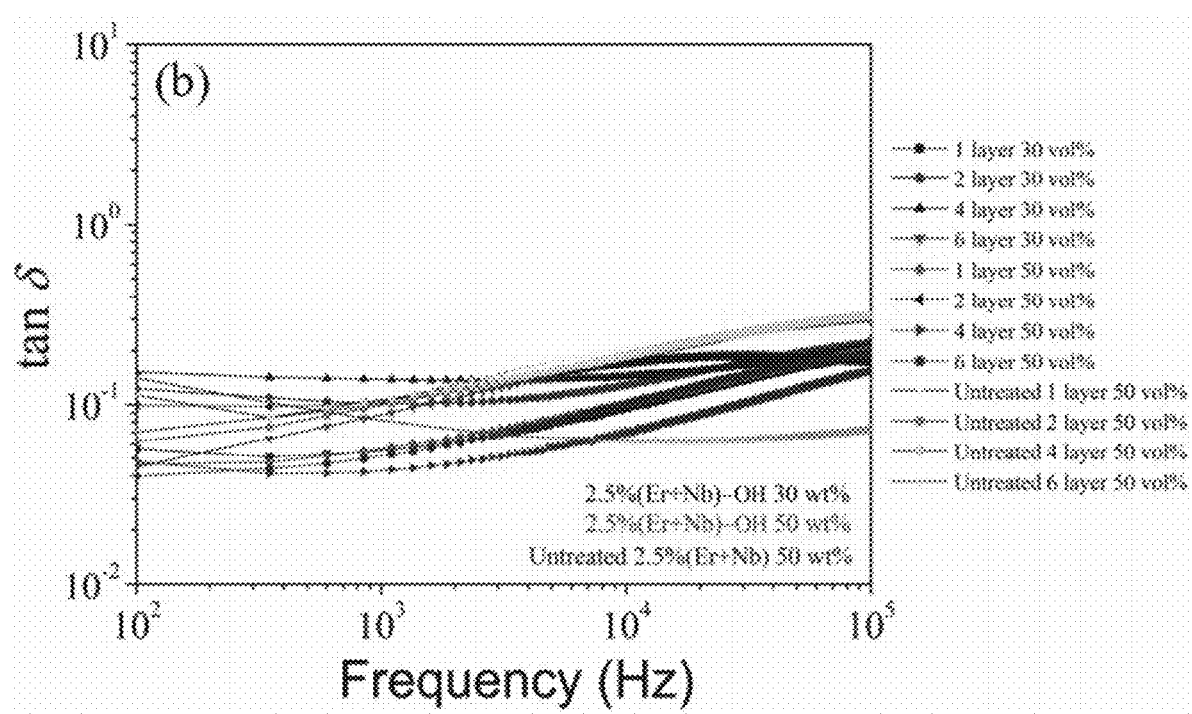
Figure 8:
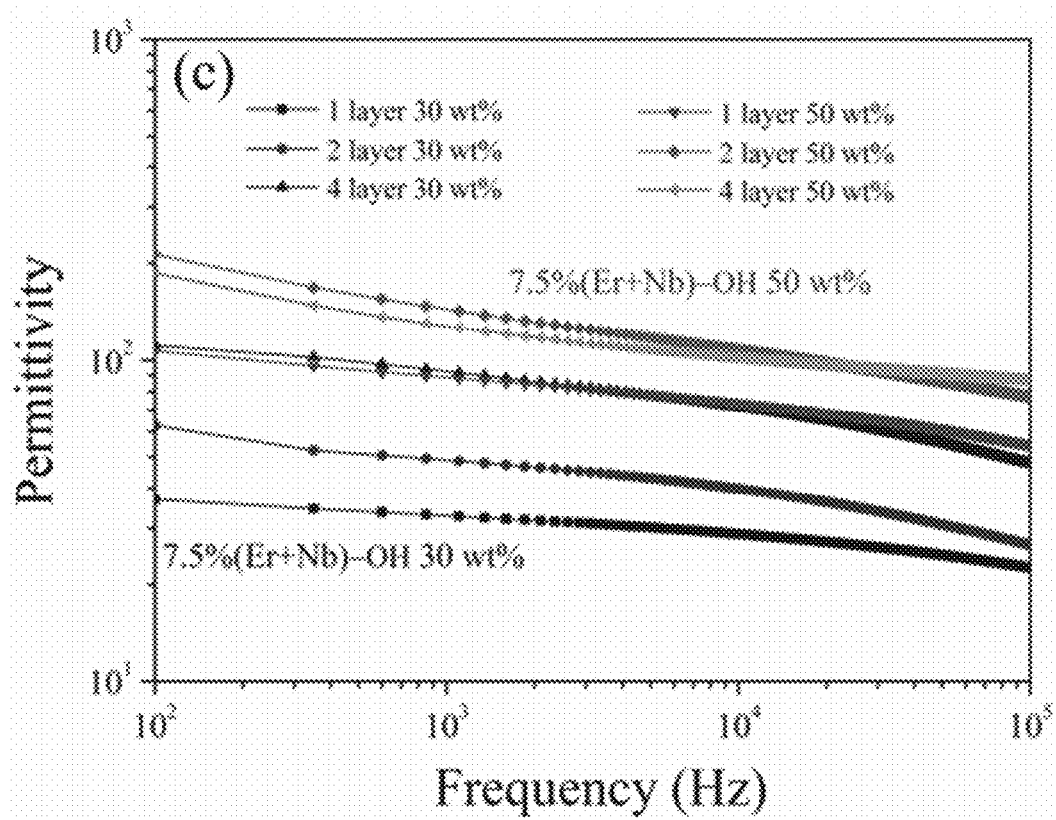
Figure 8:
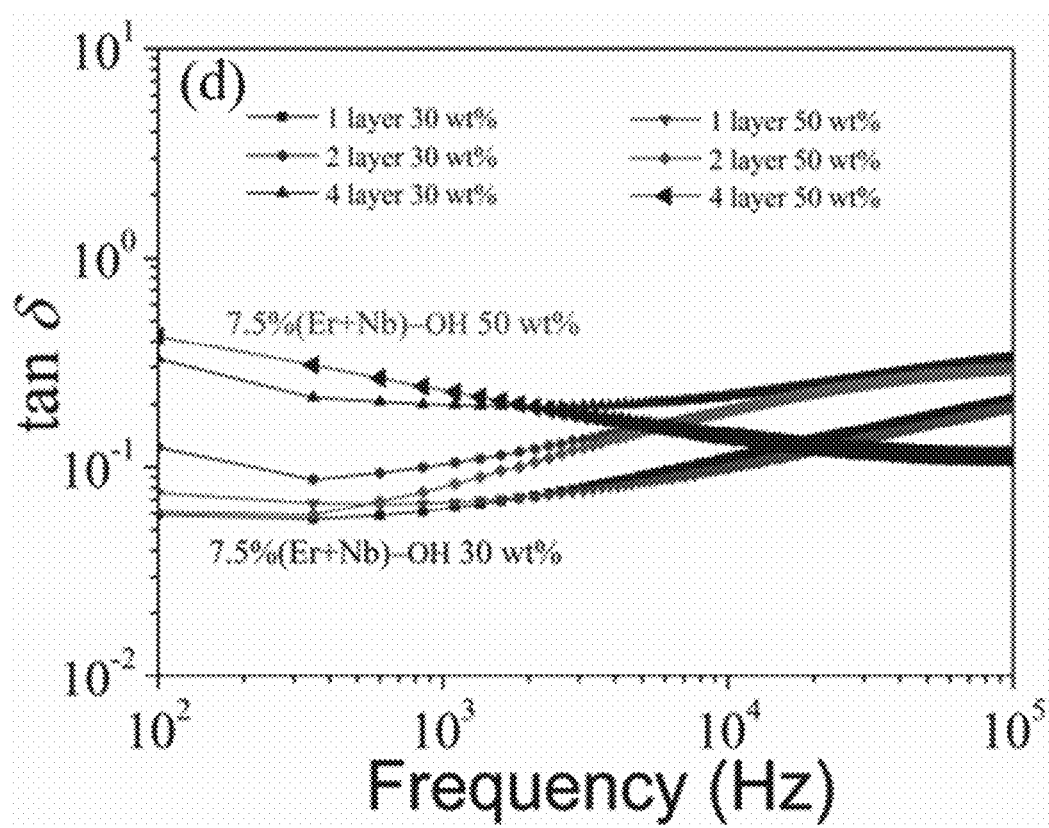

FIG. 8 shows dielectric permittivity (a and c) and loss as a function of frequency from 100 Hz to 100 kHz for various composite films (b and d). The different content of the (Er+Nb) co-doped rutile $TiO_2$ and ceramic fillers are specified in the figure, "1 layer" composite is the same as one shown in FIG. 9. Other composites are the hot-pressed samples.

Figure 9:
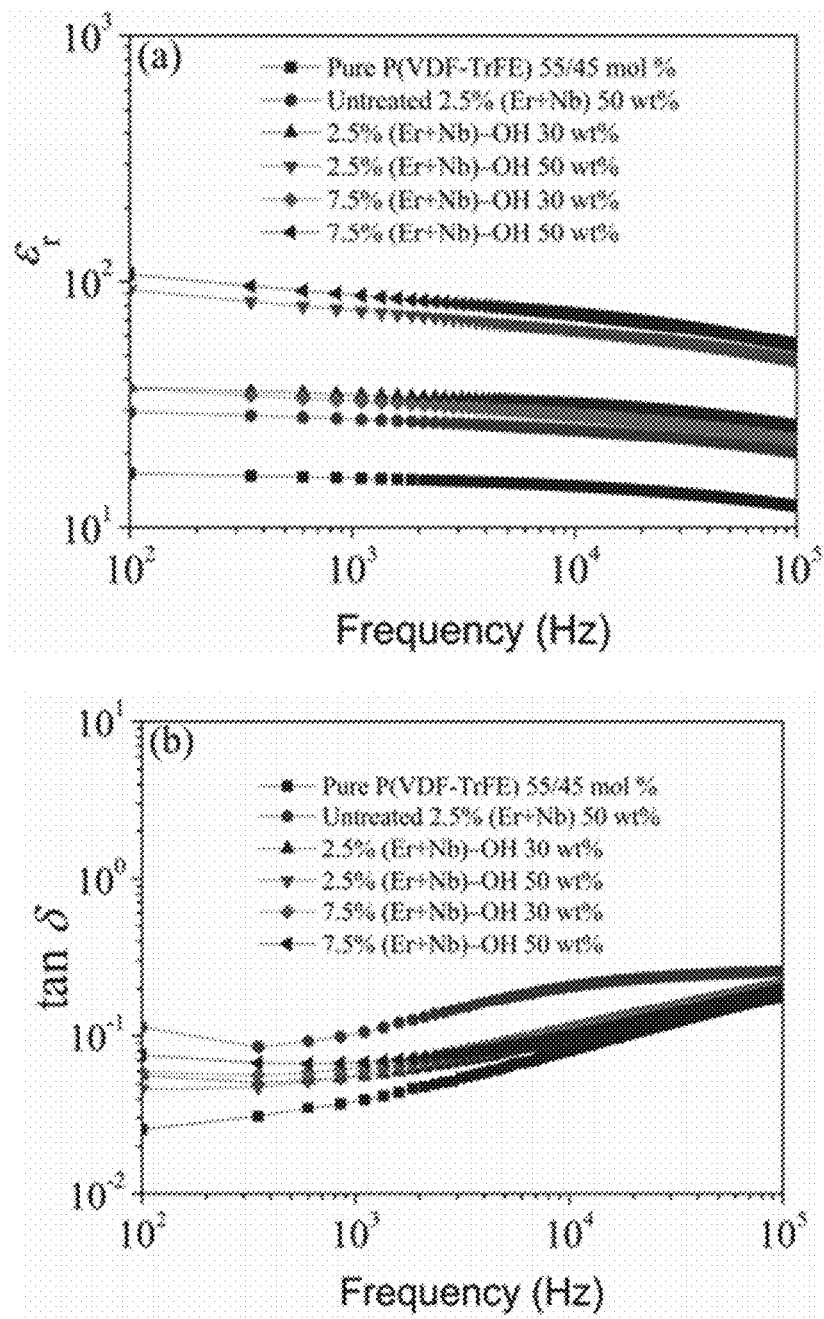
FIG. 9 depicts: (a) Dielectric permittivity and (b) loss at room temperature as a function of frequency from 100 Hz to 100 kHz for the 1 layer solution-cast composite film samples without HP.

FIG. 9 shows (a) Dielectric permittivity and (b) loss at room temperature as a function of frequency from 100 Hz to 100 kHz for the 1 layer solution-cast composite film samples without HP. The frequency dependent dielectric behaviors of 1 layer solution-cast composite layer without HP (0, 30, 50 wt %) at room temperature are shown. The pure P(VDF-TrFE) film had a relatively low $\varepsilon_r$ of 16 and tan δ (0.03). All composites suspended (Er+Nb)—OH had larger dielectric constants with lower losses than those with the untreated one. This should be attributed to the effect of the surface modification. As discussed above, hydroxyl groups on surface of the (Er+Nb)—OH facilitate homogenous particle distribution in the polymer matrix. Therefore, the films exhibit less agglomeration and defects, leading to relatively large dielectric permittivity. Besides, their $\varepsilon_r$ gradually increased with increasing percentage of codopant (Er+Nb) ions in the ceramic fillers and filler contents. Composite with 50 wt % of 7.5% (Er+Nb)—OH ceramic fillers exhibited the highest value, where $\varepsilon_r$ is 88 at 1 kHz and room temperature. All the specimens had acceptable dielectric loss, slightly increased in the higher frequency range.

Figure 10:
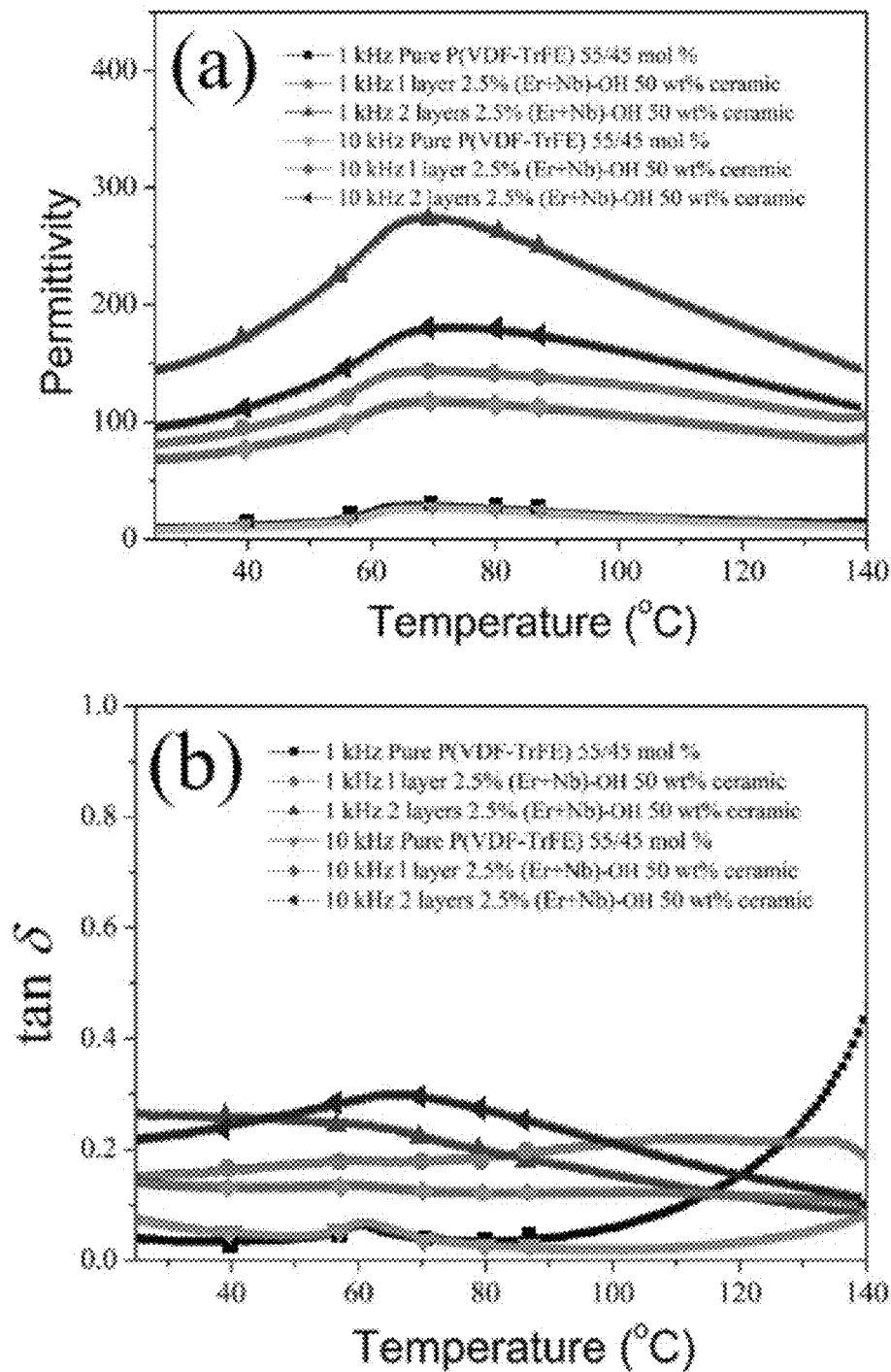
FIG. 10 depicts: (a and b) temperature dependence of dielectric behaviors of the composites with 1 layer and 2-layer 2.5% (Er+Nb)—OH ceramic filler, measured at 1 kHz and 10 kHz. For comparison, the Er of the P(VDF-TrFE) 55/45 mol % copolymer prepared using the same process is also shown in the figure.

FIG. 10 shows temperature dependence of dielectric behaviors of the composites with 1 layer and 2-layer 2.5% (Er+Nb)—OH ceramic filler, measured at 1 kHz and 10 kHz. For comparison, the $\varepsilon_r$ of the P(VDF-TrFE) 55/45 mol % copolymer prepared using the same process is also shown in the figure. As shown in FIGS. S6a and S6b, compared to pure P(VDF-TrFE), the composites possess high dielectric constant and low loss. It is observed that the value of $\varepsilon_r$ reaches its maximum at 70° C., which is the phase transformation temperature between the ferroelectric and paraelectric phases for the P(VDF-TrFE) 55/45 mol % polymer matrix [5]. It is well known that for PVDF-based ferroelectric polymers, the dielectric constant at the ferroelectric-to-paraelectric phase-transition temperature is much higher than that at room temperature [5]. On one hand, the $\varepsilon_r$ of copolymer at 1 kHz is around 30 at 70° C., whereas it is 16 at room temperature. This implies that the temperature dependence of dielectric constant observed in the composites is caused by the influence of the dielectric behavior of the polymer matrix on the composites [5]. On the other hand, the $\varepsilon_r$ of the 2-layer composites exhibited 274 and 181 at 70° C., 1 kHz and 10 kHz, respectively. A steady tan δ is found in the composites.

FIG. 11 shows a full set for comparison of experimental and theoretical dielectric permittivity of the composites films at 1 kHz and room temperature as a function of 1, 4-layer HP composites with 50 wt % 2.5% (Er+Nb)—OH ceramic fillers. Such large dielectric constants in the ceramic/polymer composites could be well described by the effective medium theory by using various theoretical models (FIG. 11). The effective dielectric constants ($\varepsilon_{eff}$) of 1 layer and 4-layer HP surface modified composites are depicted in FIG. 3d with the corresponding experimental values. The model of logarithmic mixture rule was ineffective as the predicted $\varepsilon_{eff}$ deviated from the experimental value for all the composites. However, theoretical $\varepsilon_{eff}$ values were comparable to the experimental results by using Maxwell and Garnett, Furukawa and Rayleigh's models. The difference between the experimental data and the predicted value was less than 5%. It is reported that Maxwell and Garnett, Furukawa et al., and Rayleigh models based on spherical fillers randomly immersed at the polymeric matrix, which were fitted well with experimental values [20, 37]. The EMT model is similar to the Maxwell-Garnett model, in which fillers particles are homogenously distributed, non-interacting and roughly spherical surrounded by a concentric matrix layer:

$$\varepsilon_{eff} = \varepsilon_1 \left\{ 1 + \frac{q(\varepsilon_2 - \varepsilon_1)}{\varepsilon_1 + n[(1-q)(\varepsilon_2 - \varepsilon_1)]} \right\}$$

where n is the fitting parameter or the morphology factor. Using EMT model, the experimental value fitted well with the shape parameter n=0.28. The difference between the experimental data and the predicted value for 1 layer was 3% and 16% with the 50 and 30 wt % ceramic fillers, respectively. It is stated that this model is suitable for the ceramic particles less than 10 µm and depends on their morphology. The small value of n indicates the fillers particles is in near spherical shape, while a high value of n indicates largely non-spherically shaped particles. Our ceramic particles size was around 1 µm. Therefore, the close agreement was found between the experimental and theoretical values. One of the most general attempts of describing the dielectric behavior of composites was the one by Yamada et al. [20]. It is based on the properties of the individual materials and considers a factor (n=4π/m) related with the shape and relative orientation of the fillers, while others authors only work with spherical particles. The equation that describes Yamada model is shown as follows [20]:

$$\varepsilon_{eff} = \varepsilon_1 \left\{ 1 + \frac{nq(\varepsilon_2 - \varepsilon_1)}{n\varepsilon_1 + [(1-q)(\varepsilon_2 - \varepsilon_1)]} \right\}$$

In this work, our experimental values are in close agreement with the Yamada model by taking into account the shape factor [20]. The n value is found to be 3.6 as obtained from the best fitting result. It was claimed that an n value of 3.5 was found for a PZT particle size of 1.5 µm by the work of Gregorio et al. [21]. Our results (1 µm of the ceramic fillers) are in good agreement of it.

Figure 12:
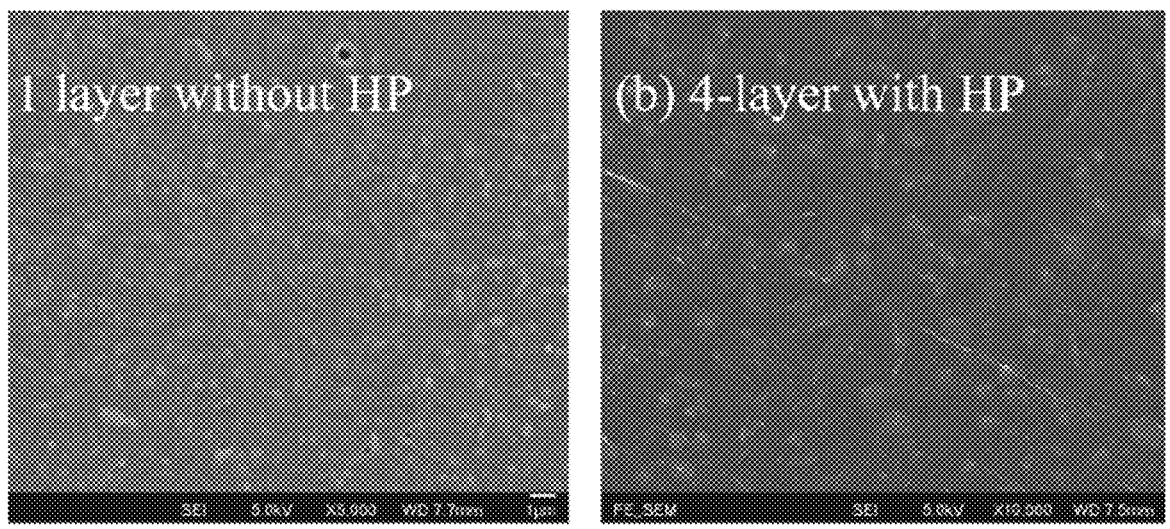
FIG. 12 depicts FESEM images of the surface morphology of composite film with 50 wt % 2.5% (Er+Nb)—OH ceramic fillers, (a) 1 layer without HP and (b) 4-layer HP samples.

FIG. 12 shows FESEM images of the surface morphology of composite film with 50 wt % 2.5% (Er+Nb)—OH ceramic fillers, (a) 1 layer without HP and (b) 4-layer HP samples. FIG. 12a shows the sample had a few voids. The voids decreased after the hot pressing process in the sample with 4-layer (FIG. 12b).

REFERENCES

There follows a list of references that are occasionally cited in the specification. Each of the disclosures of these references is incorporated by reference herein in its entirety.
[1] X. Zhang, Y. Shen, B. Xu, Q. Zhang, L. Gu, J. Jiang, J. Ma, Y. Lin, C. W. Nan, *Adv. Mater.* 2016, 28, 2055.
[2] K. Shehzad, Y. Xu, C. Gao, H. Li, Z. M. Dang, T. Hasan, J. Luo, X. Duan, *ACS Appl. Mater. Interfaces* 2017, 9, 7591.
[3] Z. M. Dang, M. S. Zheng, J. W. Zha, *Small* 2016, 12, 1688.
[4] W. Hu, Y. Liu, R. L. Withers, T. J. Frankcombe, L. Norén, A. Snashall, M. Kitchin, P. Smith, B. Gong, H. Chen, J. Schiemer, F. Brink, J. Wong-Leung, *Nat. Mater.* 2013, 12, 821.
[5] M. Arbatti, X. Shan, Z.-Y. Cheng, *Adv. Mater.* 2007, 19, 1369.
[6] Y. Bai, Z. Y. Cheng, V. Bharti, H. S. Xu, Q. M. Zhang, *Appl. Phys. Lett.* 2000, 76, 3804.
[7] S. Liu, S. Xiu, B. Shen, J. Zhai, L. B. Kong, Polymers (Basel). 2016, 8, 10.
[8] P. Thomas, S. Satapathy, K. Dwarakanath, K. B. R. Varma, Express Polym. Lett. 2010, 4,632.
[9] Z.-Y. Cheng, R. S. Katiyar, X. Yao, A. Guo, *Phys. Rev. B* 1997, 55, 8165.
[10] L. Zhang, X. Shan, P. Wu, Z. Y. Cheng, *Appl. Phys. A Mater. Sci. Process.* 2012, 107, 597.
[11] M. Y. Tse, M. K. Tsang, Y. T. Wong, Y. L. Chan, J. Hao, *Appl. Phys. Lett.* 2016, 109, 42903.
[12] C. Yang, M.-Y. Tse, X. Wei, J. Hao, *J. Mater. Chem. C* 2017, 5, 5170.
[13] X. Wei, W. Jie, Z. Yang, F. Zheng, H. Zeng, Y. Liu, J. Hao, *J. Mater. Chem. C* 2015, 3, 11005.
[14] A. J. L. and M. G. B. G. T. Davis, T. Furukawa, *Macromolecules* 1982, 15, 329.
[15] M.-Y. Tse, X. Wei, J. Hao, *Phys. Chem. Chem. Phys.* 2016, 18, 24270.
[16] Z. Pi, J. Zhang, C. Wen, Z. bin Zhang, D. Wu, *Nano Energy* 2014, 7, 33.
[17] J. Fu, Y. Hou, M. Zheng, Q. Wei, M. Zhu, H. Yan, *ACS Appl. Mater. Interfaces* 2015, 7, 24480.
[18] X. Zhao, P. Liu, Y.-C. Song, A. Zhang, X. Chen, J. Zhou, *Phys. Chem. Chem. Phys.* 2015, 17, 23132.
[19] W. Wu, X. Huang, S. Li, P. Jiang, T. Toshikatsu, *J. Phys. Chem. C* 2012, 116, 24887.
[20] T. Yamada, T. Ueda, T. Kitayama, *J. Appl. Phys.* 1982, 53, 4328.
[21] F. E. B. R. Gregorio Jr., M. Cestari, *J. Mater. Sci.* 1996, 31, 2925.
[22] M. G. Todd, F. G. Shi, *J. Appl. Phys.* 2003, 94, 4551.
[23] V. S. Puli, R. Elupula, B. C. Riggs, S. M. Grayson, R. S. Katiyar, D. B. Chrisey, *Int. J. Nanotechnol.* 2014, 11, 910.
[24] H. Luo, D. Zhang, L. Wang, C. Chen, J. Zhou, K. Zhou, *RSC Adv.* 2015, 5, 52809.
[25] X. Zhang, Y. Shen, Q. Zhang, L. Gu, Y. Hu, J. Du, Y. Lin, C. W. Nan, *Adv. Mater.* 2015, 27, 819.
[26] X. Zhang, Y. Shen, Q. Zhang, L. Gu, Y. Hu, J. Du, Y. Lin, C. W. Nan, *Adv. Mater.* 2015, 27, 819.
[27] L. Xie, X. Huang, B. W. Li, C. Zhi, T. Tanaka, P. Jiang, *Phys. Chem. Chem. Phys.* 2013, 15, 17560.
[28] Z. Yao, Z. Song, H. Hao, Z. Yu, M. Cao, S. Zhang, M. T. Lanagan, H. Liu, *Adv. Mater.* 2017, 29, 1601727.
[29] Y. Wang, J. Cui, Q. Yuan, Y. Niu, Y. Bai, H. Wang, *Adv. Mater.* 2015, 27, 6658.
[30] J. Li, S. Il Seok, B. Chu, F. Dogan, Q. Zhang, Q. Wang, *Adv. Mater.* 2009, 21, 217.
[31] S. Adireddy; V. S. Puli; T. J. Lou; and D. B. Chrisey, *J. Sol-Gel Sci. Technol.* 2015, 73, 641.
[32] J. Li, J. Claude, L. E. Norena-Franco, S. Il Seok, Q. Wang, *Chem. Mater* 2008, 20, 6304.
[33] P. Kim, S. C. Jones, P. J. Hotchkiss, J. N. Haddock, B. Kippelen, S. R. Marder, and J. W. Perry, *Adv. Mater.* 2007, 19, 1001.
[34] Y. Niu, Y. Bai, K. Yu, Y. Wang, F. Xiang, H. Wang, *ACS Appl. Mater. Interfaces* 2015, 7, 24168-24176.
[35] Q. Chi, T. Ma, Y. Zhang, Y. Cui, C. Zhang, J. Lin, X. Wang, Q. Lei, *J. Mater. Chem. A* 2017, 5, 16757.
[36] B. Z. Dang, T. Zhou, S. Yao, J. Yuan, J. Zha, H. Song, J. Li, Q. Chen, W. Yang, J. Bai, *Adv. Mater.* 2009, 21, 2077.

[37] T. Furukawa, K. Ishida, E. Fukada, *J. Appl. Phys.* 1979, 50, 4904.

The invention claimed is:

1. A polymer-ceramic composite material with colossal permittivity of $\varepsilon_r > 10^4$, comprising polymer matrix and ceramic powders embedded in the polymer matrix,
    wherein a part of the polymer matrix is exposed and adsorbed to the surface of the ceramic powders, and the polymer is electrically insulating;
    wherein the ceramic powders comprise or essentially consist of metal-ion doped $TiO_2$ ceramic powders; and the doping metal is one or both selected from Er and Nb.

2. The polymer-ceramic composite material according to claim 1, wherein the polymer is a fluoropolymer.

3. The polymer-ceramic composite material according to claim 1, which is in the form of a flexible sheet with 1, 2, 3, 4, 5, 6, 7, 8, 9, 10 layers or more.

4. The polymer-ceramic composite material according to claim 1, wherein a part of the polymer is adsorbed physically or chemically to the surface of the ceramic powders.

5. A method for fabricating the polymer-ceramic composite material according to claim 1, comprising
    hydroxylating ceramic powders,
    mixing the ceramic powders with a polymer solution,
    subjecting the mixture to solution casting to obtain a film, and
    optionally hot pressing the casting film.

6. The method according to claim 5, wherein the hydroxylating step comprises
    treating the ceramic powders with a $H_2O_2$ solution under stirring and heating at 50-150° C. for 1-5 h,
    collecting the powders by centrifuge,
    washing the powders with water and then alcohol, and drying at 50-100° C.

7. The method according to claim 5, wherein the hot pressing is performed by heating at 150-250° C. for 5-30 min.

8. The method according to claim 5, wherein the polymer solution is prepared by dissolving the polymer in an organic solvent.

9. The method according to claim 5, comprising
    treating ceramic powders with a $H_2O_2$ solution under stirring and heating at 50-150° C. for 1-5 h,
    collecting the powders by centrifuge,
    washing the powders with distilled water and ethanol,
    drying at 50-100° C. to obtain ceramic powders with a modified surface,
    dissolving poly(vinylidene fluoride trifluoroethylene) powders in dimethylformamide to obtain a poly(vinylidene fluoride trifluoroethylene) solution,
    dispersing ultrasonically the obtained ceramic powders in dimethylformamide to obtain a ceramic powder solution,
    introducing the ceramic powder solution into the poly(vinylidene fluoride trifluoroethylene) solution with stirring for 4-12 h,
    sonicating the resulting mixture to form a stable suspension,
    depositing to form a composite film, and
    subjecting the film to hot pressing to obtain the polymer-ceramic composite.

10. The method according to claim 9, wherein the poly(vinylidene fluoride trifluoroethylene) solution has a concentration of 10 wt %, and the ceramic powder solution has a concentration of 3-5 wt %.

11. The method according to claim 10, prior to hot pressing, comprising annealing the film at 100-150° C. for 8-12 h.

12. The method according to claim 10, further comprising performing solution-casting for 2-6 times to obtain the polymer-ceramic composite with multiple layers.

13. An electric capacitor, comprising the polymer-ceramic composite material according to claim 1 as dielectric layer.

14. The polymer-ceramic composite material according to claim 1, wherein the metal-ion doped $TiO_2$ ceramic is represented by a formula of $(Er_m Nb_n)_x Ti_{1-x} O_2$, wherein $m \geq 0$, $n \geq 0$, $m+n=1$, and $0 < x \leq 1$.

15. The polymer-ceramic composite material according to claim 2, wherein the polymer is selected from the group consisting of polytetrafluoroethylene (PTFE) and polyvinylidenefluoride (PVDF).

16. The polymer-ceramic composite material according to claim 4, wherein hydrogen bond is formed between the ceramic powders and the polymer.

17. The method according to claim 5, wherein the ceramic powders are hydroxylated with $H_2O_2$.

18. The method according to claim 6, wherein the alcohol is ethanol.

19. The method according to claim 8, wherein the organic solvent is dimethylformamide.

20. The polymer-ceramic composite material according to claim 14, wherein $x \leq 30\%$, 25%, 20%, 15%, 10%, 5%, 4%, 3%, 2%, 1%, 0.9%, 0.8%, 0.7%, 0.6%, 0.5%, 0.4%, 0.3%, 0.2%, or 0.1%, and/or m=n.

21. The polymer-ceramic composite material according to claim 15, wherein the polymer is polyvinylidenefluoride trifluoroethylene (PVDF-TrFE).

* * * * *